United States Patent
Takaichi et al.

(10) Patent No.: US 9,908,044 B2
(45) Date of Patent: Mar. 6, 2018

(54) INFORMATION PROCESSING SYSTEM AND INFORMATION PROCESSING APPARATUS

(71) Applicant: Sony Computer Entertainment Inc., Tokyo (JP)

(72) Inventors: Tomoki Takaichi, Tokyo (JP); Masahiro Fujihara, Tokyo (JP); Haijie Hewu, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 26 days.

(21) Appl. No.: 14/906,022

(22) PCT Filed: Jun. 3, 2014

(86) PCT No.: PCT/JP2014/002940
§ 371 (c)(1),
(2) Date: Jan. 19, 2016

(87) PCT Pub. No.: WO2015/022763
PCT Pub. Date: Feb. 19, 2015

(65) Prior Publication Data
US 2016/0151707 A1    Jun. 2, 2016

(30) Foreign Application Priority Data
Aug. 12, 2013 (JP) ................. 2013-167750

(51) Int. Cl.
*G06F 17/00* (2006.01)
*A63F 13/25* (2014.01)
(Continued)

(52) U.S. Cl.
CPC .............. *A63F 13/25* (2014.09); *A63F 13/73* (2014.09); *A63F 13/795* (2014.09); *A63F 13/86* (2014.09);
(Continued)

(58) Field of Classification Search
USPC ...................................................... 463/30–33
See application file for complete search history.

(56) References Cited

U.S. PATENT DOCUMENTS

| 2004/0229687 A1 | 11/2004 | Miyamoto |
| 2014/0132536 A1* | 5/2014 | Ikenaga ................ G06F 3/0488 345/173 |

(Continued)

FOREIGN PATENT DOCUMENTS

| JP | 2002282536 A | 10/2002 |
| JP | 4203524 B2 | 1/2009 |

(Continued)

OTHER PUBLICATIONS

European Search Report for corresponding EP Application No. 14836120.7 8 pages, dated Feb. 9, 2017.

(Continued)

*Primary Examiner* — Ronald Laneau
(74) *Attorney, Agent, or Firm* — Matthew B. Dernier, Esq.

(57) ABSTRACT

An image of a game played by a user A is streaming distributed to information processing apparatuses of users B, C and D. On an outputting apparatus of the user A, candidates for a user who is to play the game in place of the user A are presented. To a user who has the operation right of the game, a controller mark indicating that the user has the operation right of the game is applied. Consequently, the user A can recognize at a glance who has the operation right.

6 Claims, 22 Drawing Sheets

(51) Int. Cl.
*A63F 13/795* (2014.01)
*A63F 13/73* (2014.01)
*A63F 13/86* (2014.01)
A63F 13/847 (2014.01)
A63F 13/822 (2014.01)
A63F 13/87 (2014.01)

(52) U.S. Cl.
CPC ........... *A63F 13/822* (2014.09); *A63F 13/847* (2014.09); *A63F 13/87* (2014.09)

(56) References Cited

U.S. PATENT DOCUMENTS

| | | | | |
|---|---|---|---|---|
| 2014/0187324 | A1* | 7/2014 | Masuda | A63F 13/10 463/31 |
| 2014/0349753 | A1* | 11/2014 | Imai | A63F 13/10 463/31 |
| 2015/0024842 | A1 | 1/2015 | Imai | |
| 2015/0281296 | A1* | 10/2015 | Takaichi | A63F 13/355 709/231 |
| 2016/0266732 | A1* | 9/2016 | Gyobu | G06F 3/0481 |
| 2016/0353425 | A1* | 12/2016 | Iwami | H04N 21/436 |
| 2017/0118530 | A1* | 4/2017 | Amano | H04N 21/6175 |

FOREIGN PATENT DOCUMENTS

| | | |
|---|---|---|
| JP | 2011188887 A | 9/2011 |
| JP | 2012034793 A | 2/2012 |
| JP | 5249675 B2 | 7/2013 |
| WO | 2008099867 A1 | 8/2008 |
| WO | 2013111247 A1 | 8/2013 |

OTHER PUBLICATIONS

International Preliminary Report on Patentability and Written Opinion for corresponding PCT Application No. PCT/JP2014/002940, 10 pages, dated Feb. 25, 2016.

International Search Report for corresponding PCT Application No. PCT/JP2014/002940, 2 pages, dated Sep. 2, 2014.

Office Action for corresponding JP Application No. 12013167750, 9 pages, dated Oct. 31, 2017.

4Gamer. net disclosure of a flow of a game in "Fortune Street Wii" "Easy Rule" for a beginner. Even in Easy Rule, we firmly tast likely the real thrill of "Fortune Street" [online retrieval on Jul. 21, 2011] URL   http://www.4gamer.net/games/134/G013486/20110715023/ 10 pages, Oct. 16, 2017 (for relevancy see Office Action for corresponding JP Application No. 12013167750, 9 pages, dated Oct. 31, 2017 cited above).

* cited by examiner

FIG.2
(a)
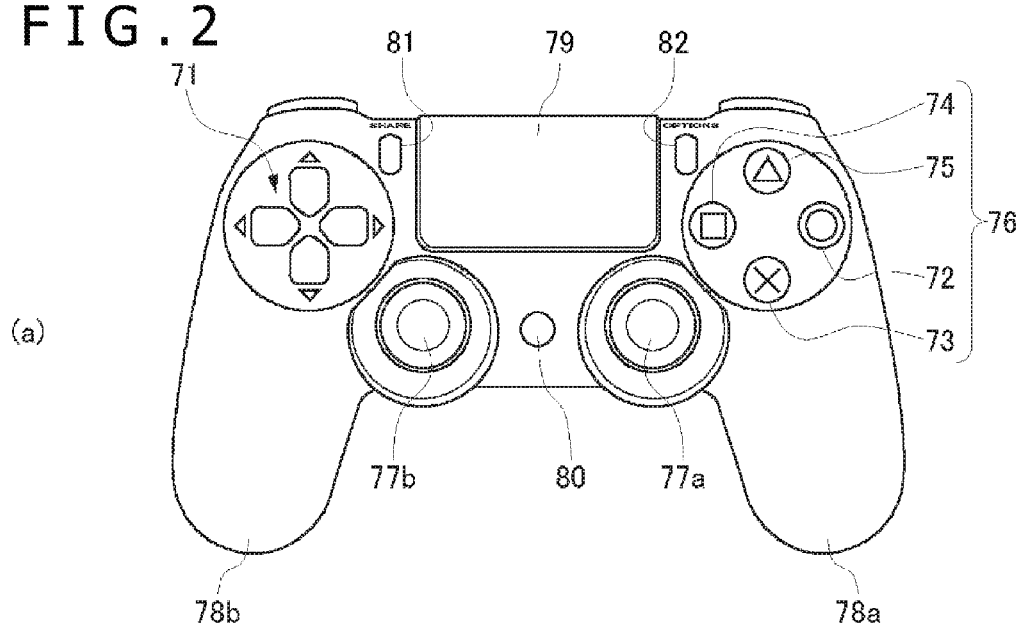
(b)
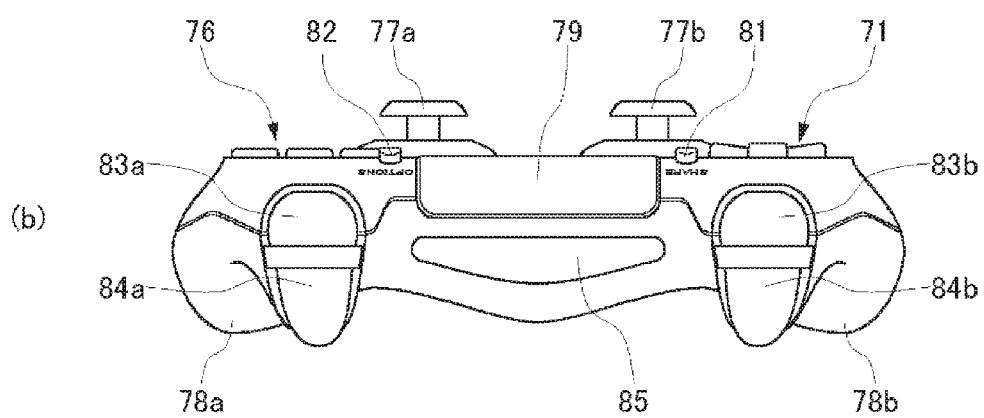

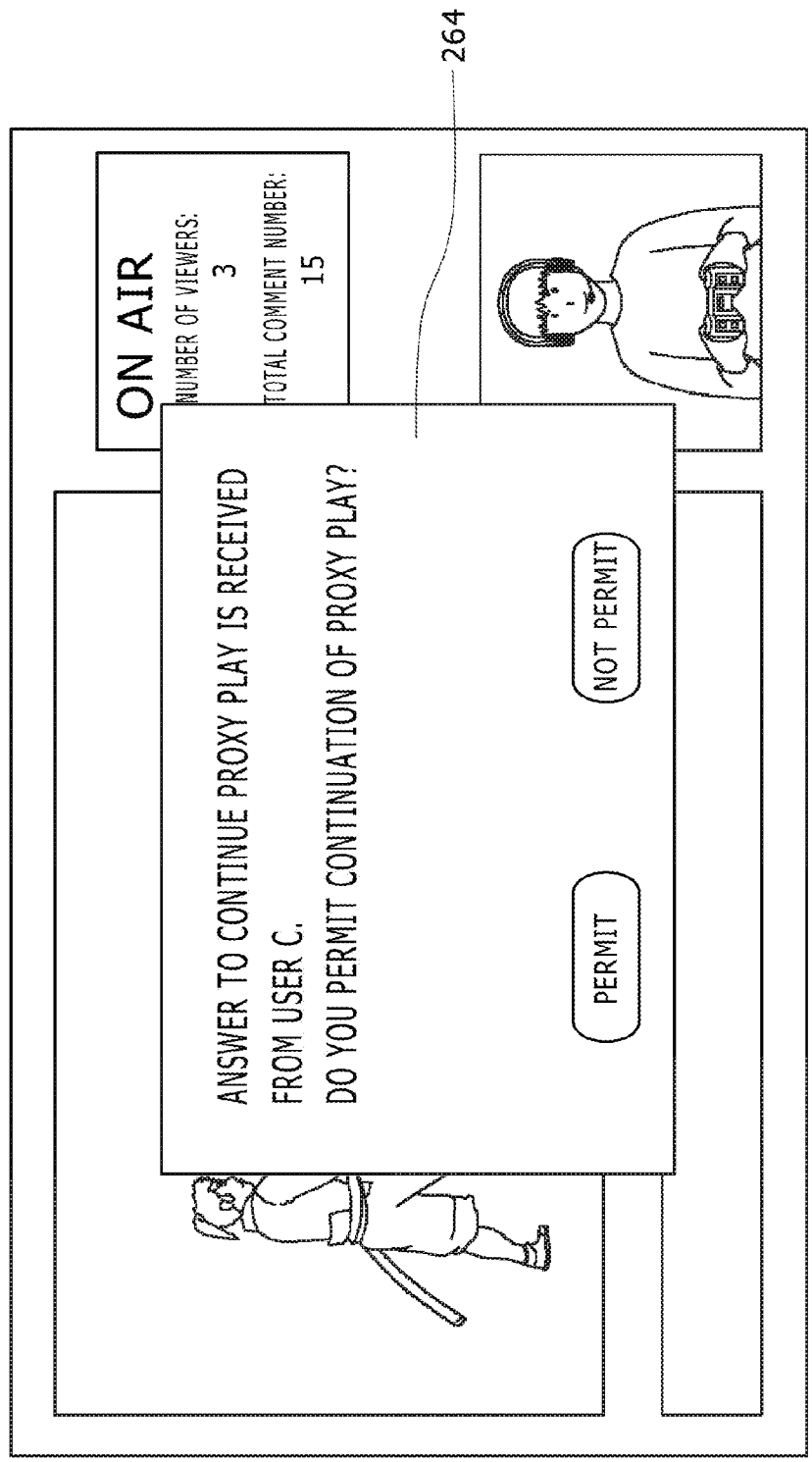

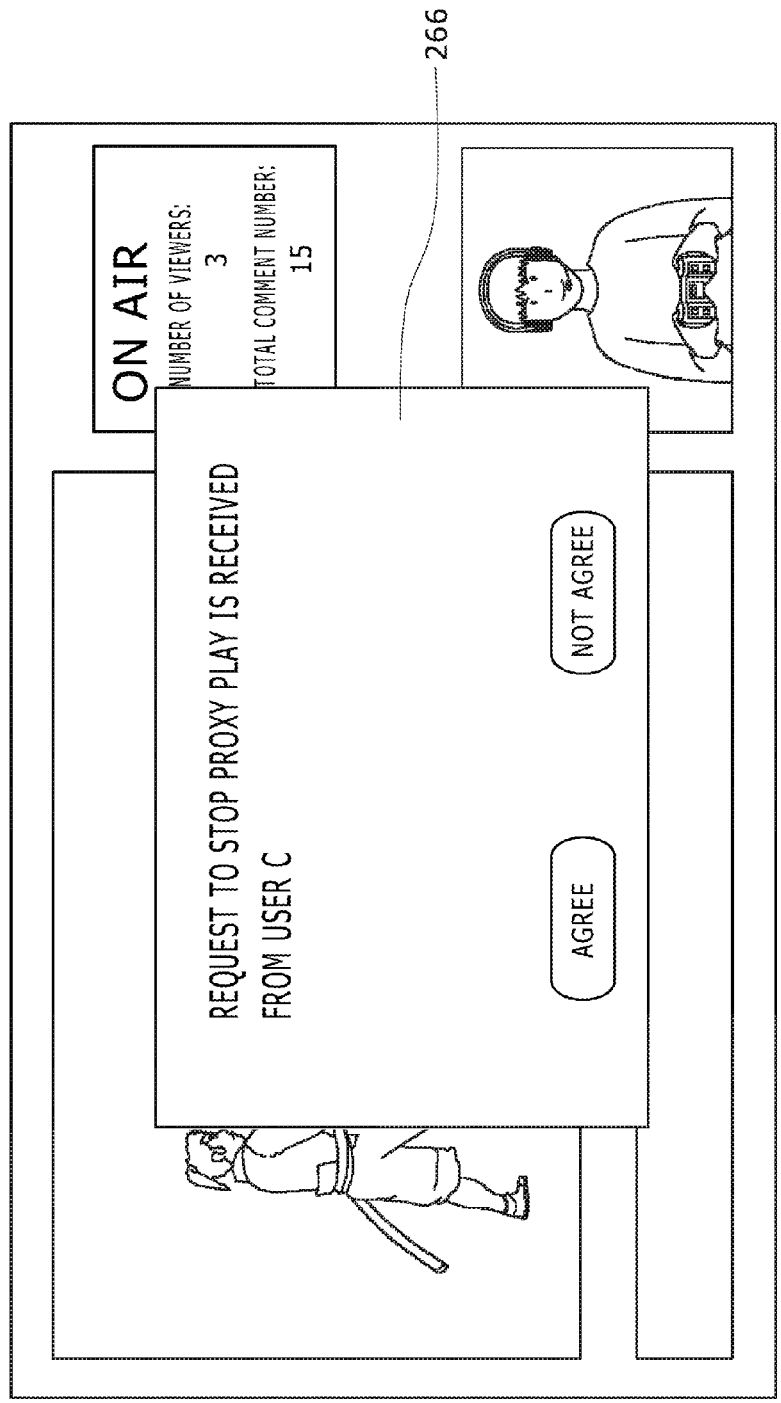

INFORMATION PROCESSING SYSTEM AND INFORMATION PROCESSING APPARATUS

TECHNICAL FIELD

The present invention relates to an information processing technology for distributing or viewing streaming data of a game image.

BACKGROUND ART

In recent years, a service by which a moving image created or captured by a user is shared has become popular. Also it has become possible to couple terminals of users by peer-to-peer (P2P) connection so that the users can communicate directly with each other. The users can utilize such a mechanism as just described to share various data with other users through the Internet.

Further, an environment in which a plurality of users play a game together through the Internet has been created, and such a network service of a game as just described has already become a role as a communication tool. PTL 1 proposes a game distribution system wherein a game apparatus of a distribution source can distribute information relating to a play situation of a game to a game apparatus of a reception side and a user of the reception side can take part in the game being executed by the game apparatus of the distribution source.

CITATION LIST

Patent Literature

[PTL 1] Japanese Patent Laid-Open No. 2012-34793

SUMMARY

Technical Problem

The inventor of the present invention paid attention to the possibility of a technology for distributing a game image on the real time basis and conceived a new way of enjoying a game.

Thus, it is an object of the present invention to provide a new way of enjoying a game to a distribution user and a viewing user when game image data of a game being played is streaming distributed.

Solution to Problem

In order to solve the problem described above, an information processing system according to a mode of the present invention is an information processing system in which a first information processing apparatus operated by a first user and a second information processing apparatus operated by a second user are coupled to each other through a network. The first information processing apparatus includes an execution unit configured to execute a game program in response to operation information of the first user, a distribution processing section configured to transmit image data of a game being played by the first user to the second information processing apparatus, and a proxy management unit configured to display information for specifying the second user as a candidate for a user who is to play the game in place of the first user. The second information processing apparatus includes an image data acquisition section configured to acquire the image data of the game being played by the first user, a reproduction processing section configured to reproduce a game image using the acquired image data, and an operation information transmission section configured to transmit operation information of the second user to the first information processing apparatus. The proxy management unit displays, when candidates for a user are displayed, user specification information in such a manner that a user who has an operation right of the game and a user who does not have the operation right of the game can be distinguished from each other.

Another mode of the present invention is an information processing apparatus operated by a first user, which includes an execution unit configured to execute a game program in response to operation information of the first user, a distribution processing section configured to transmit image data of a game being played by the first user to a different information processing apparatus operated by a second user, and a proxy management unit configured to display information for specifying the second user as a candidate for a user who is to play the game in place of the first user. The proxy management unit displays, when candidates for a user are displayed, user specification information in such a manner that a user who has an operation right of the game and a user who does not have the operation right of the game can be distinguished from each other.

It is to be noted that also arbitrary combinations of the constituent elements described above and the representations of the present invention obtained by conversion thereof between a method, an apparatus, a system, a recording medium, a computer program and so forth are effective as modes of the present invention.

BRIEF DESCRIPTION OF DRAWINGS

FIG. 2(a) is a diagram depicting an appearance configuration of an upper face of an inputting apparatus, and (b) is a diagram depicting an appearance configuration of a rear face of the inputting apparatus.

FIG. 15 is a view depicting a confirmation screen image regarding whether or not a proxy play displayed on an outputting apparatus of the user B is to be consented to.

FIG. 17 is a view depicting a confirmation screen image regarding whether or not a proxy play displayed on an outputting apparatus of the user C is to be consented to.

FIG. 21 is a view depicting an example of an answer confirmation screen image displayed on the outputting apparatus of the user A.

FIG. 22 is a view depicting an example of a stopping confirmation screen image displayed on the outputting apparatus of the user A.

DESCRIPTION OF EMBODIMENT

Figure 1:
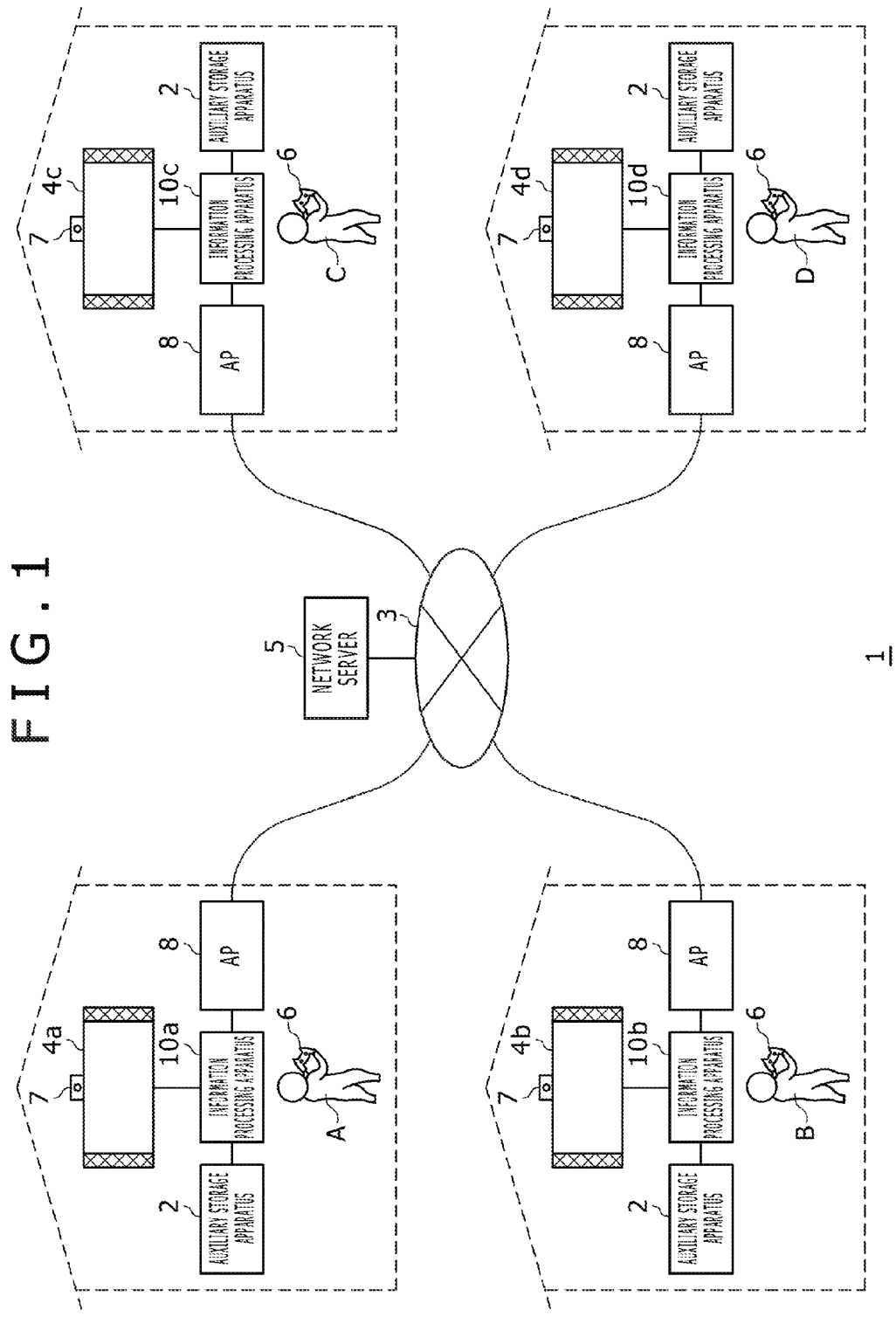
FIG. 1 is a diagram depicting an information processing system according to an embodiment of the present invention.

FIG. 1 depicts an information processing system 1 according to an embodiment of the present invention. The information processing system 1 includes information processing apparatuses 10a, 10b, 10c and 10d (where they are not distinguished from each other particularly, they are referred to as "information processing apparatus 10") which are operated by users, and a network server 5. The information processing apparatus 10 and the network server 5 are connected to each other through a network 3 such as the Internet or a LAN (Local Area Network). In the present embodiment, a user A operates the information processing apparatus 10a; a user B operates the information processing apparatus 10b; a user C operates the information processing apparatus 10c; and a user D operates the information processing apparatus 10d. An access point (hereinafter referred to as AP) 8 has a function of a wireless access point and a router. The information processing apparatus 10 connects to the AP 8 by wireless or wire connection and communicatively connects to the network server 5 on the network 3 and the information processing apparatus 10 operated by the different users.

The information processing apparatus 10 establishes connection to an inputting apparatus 6, which is operated by a user, by wireless or wire connection, and the inputting apparatus 6 outputs operation information representative of a result of the operation of the user to the information processing apparatus 10. If the information processing apparatus 10 accepts operation information from the inputting apparatus 6, then it reflects the operation information on processing of system software or application software, and a result of the processing is outputted from an outputting apparatus. In the information processing system 1, the information processing apparatus 10 may be a game apparatus which executes a game, and the inputting apparatus 6 may be an apparatus which supplies operation information of the user to the information processing apparatus 10 such as a game controller. In the information processing system 1, the information processing apparatus 10 of one user streaming distributes game image data of a game being played to the information processing apparatus 10 of the different users. Accordingly, the information processing system 1 in the present embodiment operates as a game image distribution system.

It is necessary for each user in the information processing system 1 to log in an OS (system software) of the information processing apparatus 10 in order to execute an application of a game or the like. The user who logs in the system software is managed by a user account registered in the information processing apparatus 10.

The network server 5 is maintained and managed by the management entity of the information processing system 1 and provides a network service of a game to users of the information processing system 1. The network server 5 manages network accounts for identifying the users, and a user would use its network account to sign in to the network service provided by the network server 5. By signing in to the network service from the information processing apparatus 10, the user can register save data of a game or a virtual award article (trophy) acquired during game play into the network server 5.

In the information processing system 1, the user A is a player who plays a game, and a game image during execution is displayed on an outputting apparatus 4a from the information processing apparatus 10a. Meanwhile, the users B, C and D are viewing users who view a game image being played by the user A, and the information processing apparatuses 10b, 10c and 10d receive streaming data of the game image from the information processing apparatus 10a, reproduce and display the received streaming data on outputting apparatuses 4b, 4c and 4d, respectively. In the following description, where the outputting apparatuses 4a, 4b, 4c and 4d are not distinguished particularly from one another, they are collectively referred to as "outputting apparatus 4." It is to be noted that, although, in the embodiment, the information processing apparatuses 10 are connected to each other by P2P connection and transfer data to each other, such transfer of data may be carried out through a shared server (not depicted) connected to the network 3.

An auxiliary storage apparatus 2 is a large capacity storage apparatus such as an HDD (Hard Disk Drive) or a flash memory and may be an external storage apparatus connected to the information processing apparatus 10 by a USB (Universal Serial Bus) or may be a built-in type storage apparatus. The outputting apparatus 4 may be a television set having a display unit which outputs an image and a speaker which outputs sound or may be a computer display unit. The outputting apparatus 4 may be connected to the information processing apparatus 10 by a wire cable or by wireless connection.

The inputting apparatus 6 is configured having a plurality of inputting units such as a plurality of operation buttons of the push type, an analog stick which can input an analog quantity and turning buttons. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, the camera 7 may otherwise be disposed sidewardly of the outputting apparatus 4. Whatever the case may be, the camera 7 is disposed at a position at which the camera 7 can pick up an image of a user who plays a game in front of the outputting apparatus 4. In the information processing system 1 of the present embodiment, picked up image data obtained by imaging the user A who is a player may be distributed on the real time basis to the information processing apparatuses 10b, 10c and 10d of the users B, C and D together with image data of the game played by the user A.

FIG. 2(a) depicts an appearance configuration of an upper face of the inputting apparatus. The user would grasp a left side grip portion 78b by the left hand and grasp a right side grip portion 78a by the right hand to operate the inputting apparatus 6. On an upper face of a housing of the inputting apparatus 6, a direction key 71, analog sticks 77a and 77b and four different operation buttons 76 which are inputting units are provided. Four buttons 72 to 75 have different figures marked with different colors thereon in order to allow distinction thereof from one another. In particular, the circle button 72 is marked with a red round mark; the cross button 73 with a blue cross mark; the square button 74 with a purple square mark; and the triangular button 75 with a green triangle mark. On the upper face of the housing, a touch pad 79 is provided in a flat region between the direction key 71 and the operation buttons 76. The touch pad 79 functions also as a depression type button which sinks downwardly when it is pushed by the user and returns to its original position when it is released by the user.

A function button 80 is provided between the two analog sticks 77a and 77b. The function button 80 is used to turn on the power supply to the inputting apparatus 6 and simultaneously make active a communication function of connecting the inputting apparatus 6 and the information processing apparatus 10 to each other. It is to be noted that, when a main power supply is in an off state and the information processing apparatus 10 is in a standby state, if the function button 80 is depressed, the information processing apparatus 10 accepts a connection request transmitted from the inputting apparatus 6 also as an instruction to turn on the main power supply. Consequently, the information processing apparatus 10 is returned to be in an active state from the standby state. After the inputting apparatus 6 is connected to the information processing apparatus 10, the function button 80 is used also to cause the information processing apparatus 10 to display a menu screen image.

A SHARE button 81 is provided between the touch pad 79 and the direction key 71. The SHARE button 81 is utilized to input an instruction from the user to an OS or the system software in the information processing apparatus 10. An OPTION button 82 is provided between the touch pad 79 and the operation buttons 76. The OPTION button 82 is utilized to input an instruction from the user to application (game) software executed by the information processing apparatus 10. The SHARE button 81 and the OPTION button 82 may each be formed as a push-type button.

FIG. 2(b) depicts an appearance configuration of a rear face of the inputting apparatus. On the upper side of the rear face of the housing of the inputting apparatus 6, the touch pad 79 is provided so as to extend from the upper face of the housing, and a horizontally elongated light emitting portion 85 is provided on the lower side of the rear face of the housing. The light emitting portion 85 has LEDs of red (R), green (G) and blue (B) and is turned on in accordance with emission light color information transmitted thereto from the information processing apparatus 10. On the rear face of the housing, an upper side button 83a and a lower side button 84a, and another upper side button 83b and another lower side button 84b are provided at positions in a leftwardly and rightwardly symmetrical relationship in a longitudinal direction. The upper side button 83a and the lower side button 84a are operated by the forefinger and the middle fainter of the right hand of the user, respectively, and the upper side button 83b and the lower side button 84b are operated by the forefinger and the middle finger of the left hand of the user, respectively. The upper side buttons 83 may be configured as push-type buttons while the lower side buttons 84 may be configured as trigger type buttons supported for pivotal motion.

Figure 3:
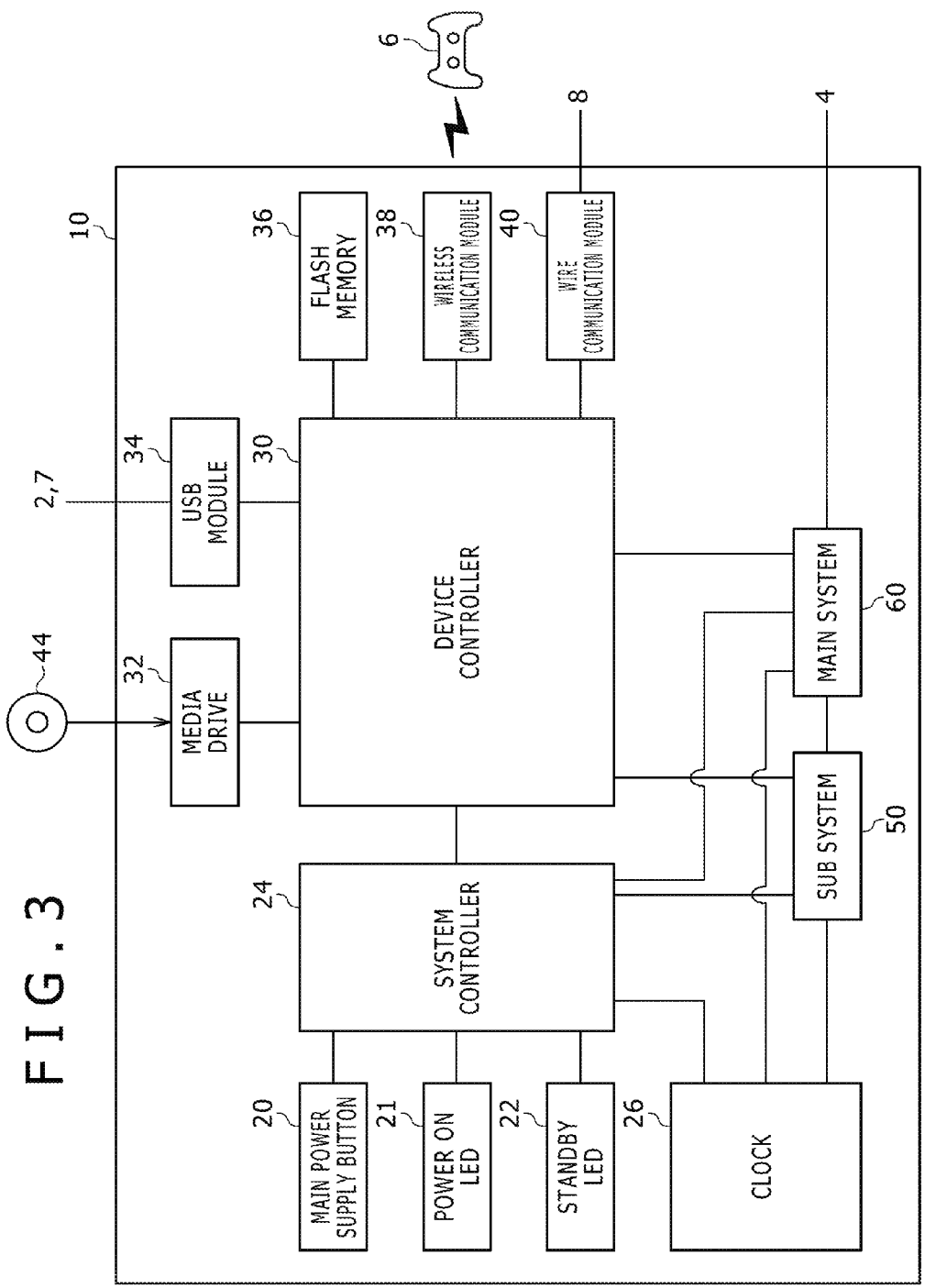
FIG. 3 is a diagram depicting a functional block diagram of an information processing apparatus.

FIG. 3 depicts a functional block diagram of the information processing apparatus 10. The information processing apparatus 10 is configured including a main power supply button 20, a power ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 is configured having a main CPU (Central Processing Unit), and the sub system 50 is configured having a sub CPU. The main CPU and the sub CPU operate exclusively. While the main CPU is started and is in an active state, the sub CPU is in a standby state, but while the sub CPU is started and is in an active state, the main CPU is in a standby state. While the main power supply to the information processing apparatus 10 remains on, the main CPU executes various processes of an application or the like under an environment generated by system software while the sub CPU is asleep. On the other hand, if the main power supply to the information processing apparatus is turned off, then the main CPU starts up the sub CPU and enters an asleep state. In this manner, the main CPU and the sub CPU operate exclusively.

The main power supply button 20 is an inputting unit to which an operation input from the user is carried out and is provided on a front face of a housing of the information processing apparatus 10 such that it is operated in order to turn on or off the power supply to the main system 60 of the information processing apparatus 10. It is to be noted that such a configuration that turning on/off of the main power supply is carried out by a short press operation of the main power supply button 20 but, if the main power supply button 20 is long-pressed, then the system power supply to the information processing apparatus 10 is turned off to stop the power supply to the information processing apparatus 10 may be adopted.

The system controller 24 detects depression of the main power supply button 20 by the user. It is to be noted that turning on/off of the main power supply can be controlled from the inputting apparatus 6 as described hereinabove, and if the function button 80 of the inputting apparatus 6 is depressed when the main power supply is in an off state, then the system controller 24 acquires the button operation as an "on instruction." If the system controller 24 acquires an on instruction, then it notifies the sub system 50, which is in an active state, of a result of the detection and turns off the standby LED 22 while it turns on the power ON LED 21. At this time, the sub system 50 starts up the main system 60 and itself enters a standby mode. On the other hand, if the system controller 24 acquires an off instruction, then it notifies the main system 60, which is in an active state, of a result of the detection and turns off the power ON LED 21 while it turns on the standby LED 22. At this time, the main system 60 starts up the sub system 50 and itself enters a standby mode.

While the main CPU has a function of executing a game program installed in the auxiliary storage apparatus 2 or a game program recorded on the ROM medium 44, the sub CPU does not have the function. However, the sub CPU has a function of accessing the auxiliary storage apparatus 2 and another function of transferring data to and from the network server 5. The sub CPU is configured having only such limited processing functions and accordingly can operate with lower power consumption than the main CPU.

The clock 26 is a real time clock, and generates date and time information at present and supplies the generated information to the system controller 24, sub system 50 and main system 60.

Figure 5:
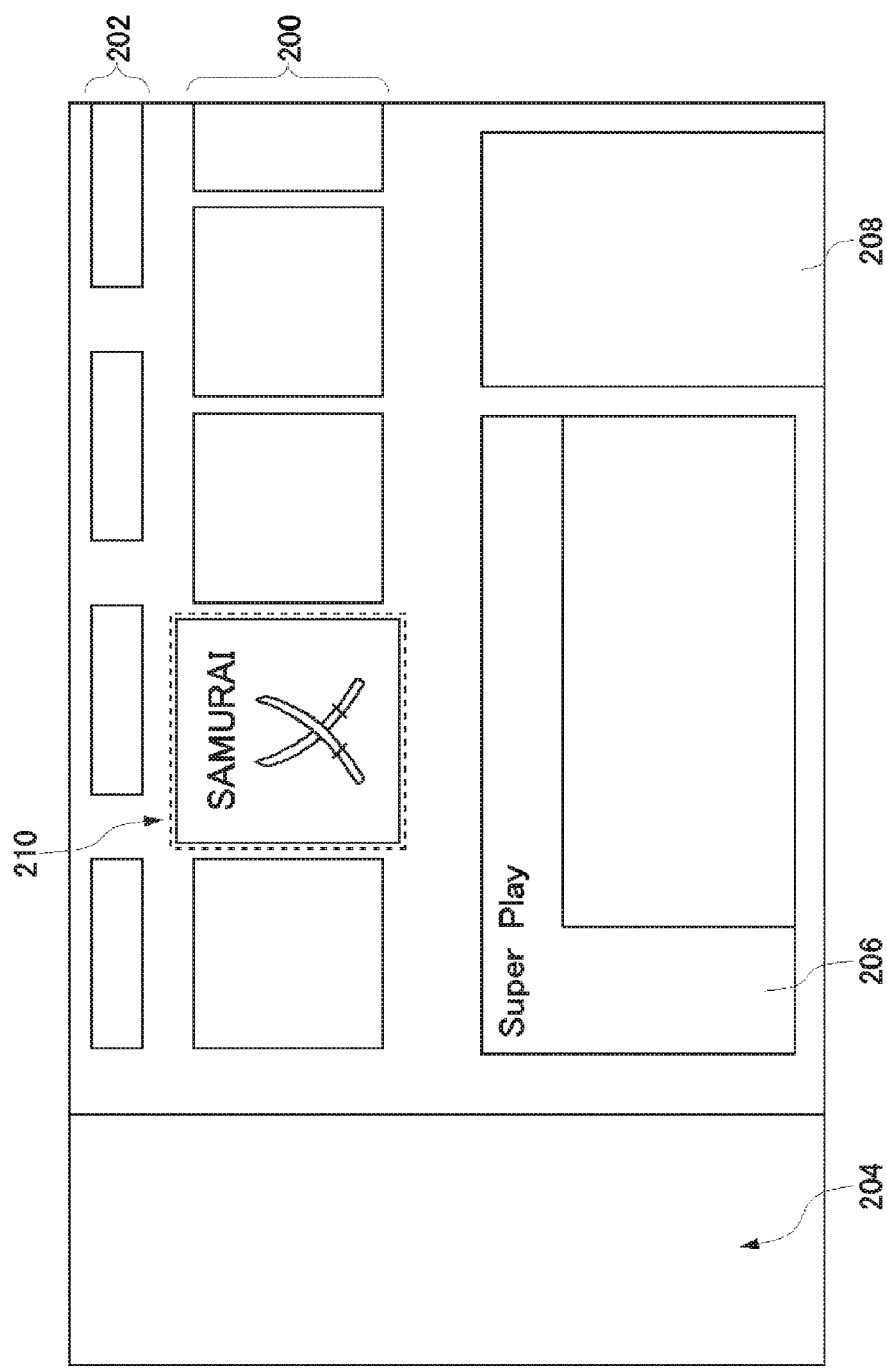
FIG. 5 is a diagram depicting an example of a menu screen image displayed on an outputting apparatus.

The device controller 30 is configured as an LSI (Large-Scale Integrated Circuit) which executes delivery of information between devices like a south bridge. As depicted in FIG. 5, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic, a difference in data transfer rate between the devices and controls the timing of data transfer.

The media drive 32 is a drive apparatus which operates a ROM medium 44, on which application software of a game or the like is recorded, loaded thereon to read out a program, data and so forth from the ROM medium 44. The ROM medium 44 is a read-only recording medium such as an optical disk, a magneto-optical disk or a Blu-ray disk.

The USB module 34 is a module to be connected to an external apparatus by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the inputting apparatus 6 using a communication protocol such as a Bluetooth (registered trademark) protocol or an IEEE 802.11 protocol. It is to be noted that the wireless communication module 38 may be compatible with a third generation (3rd Generation) digital portable telephone system compliant with the IMT-2000 (International Mobile Telecommunication 2000) standard prescribed by the ITU (International Telecommunication Union). The wire communication module 40 wire-communicates with an external apparatus and is connected to the network 3, for example, through the AP 8.

The main system 60 includes a main CPU, a memory which is a main storage apparatus and a memory controller, a GPU (Graphics Processing Unit) and so forth. The GPU is utilized principally for arithmetic processing of a game program. Those functions may be configured as a system-on-chip and formed on one chip. The main CPU has a function of starting up system software and executing an application installed in the auxiliary storage apparatus 2 under an environment provided by the system software.

The sub system 50 includes a sub CPU, a memory which is a main storage apparatus, a memory controller and so forth but does not include a GPU. The number of circuit gates of the sub CPU is smaller than the number of circuit gates of the main CPU, and the operation power consumption of the sub CPU is lower than that of the main CPU. As described hereinabove, the sub CPU operates while the main CPU is in a standby state, and the processing functions of the sub CPU are limited in order to suppress the power consumption of the sub CPU low. It is to be noted that the sub CPU and the memory may be formed on chips separate from each other.

Figure 4:
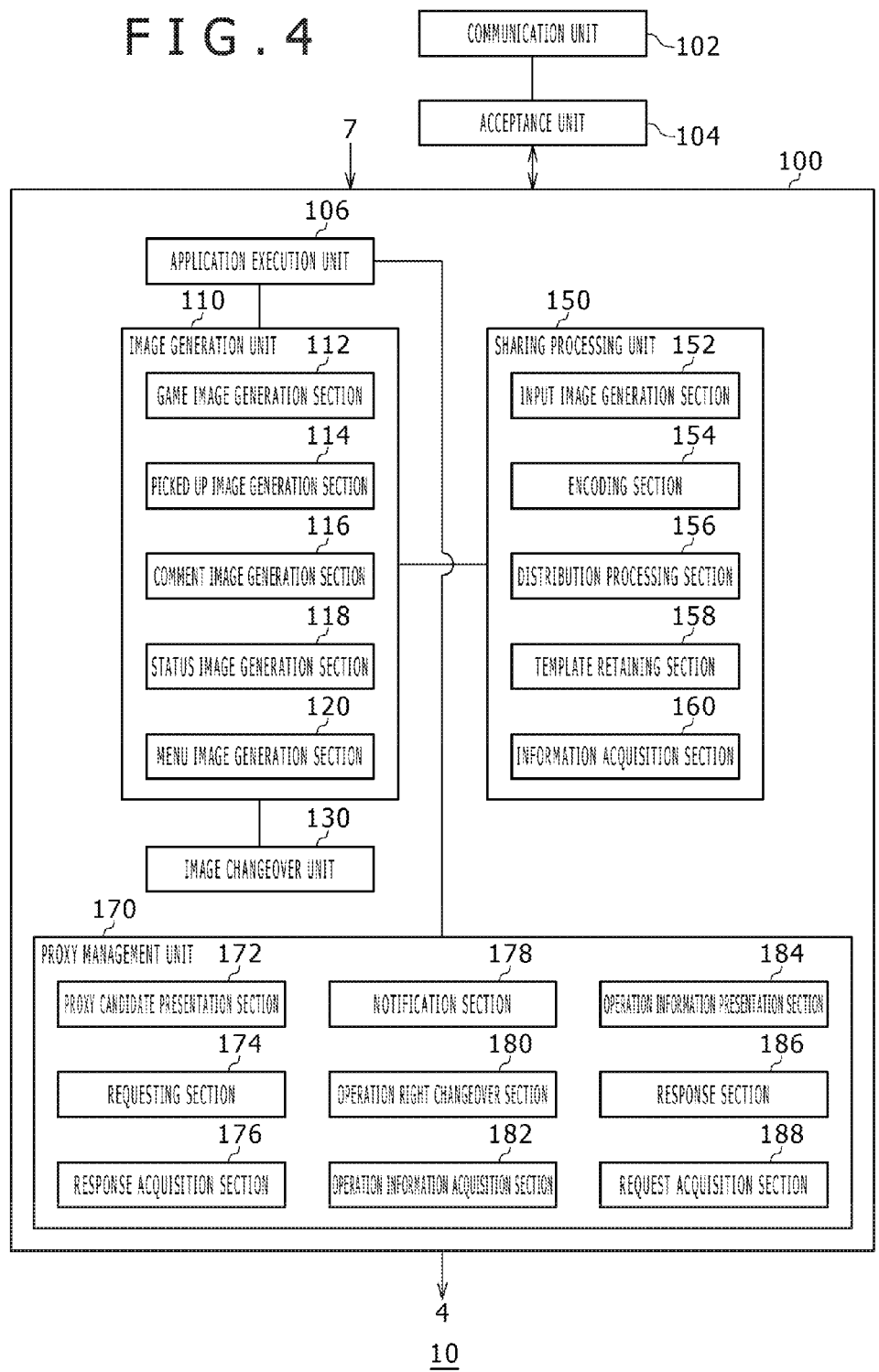
FIG. 4 is a diagram depicting an internal configuration of the information processing apparatus which operates as a distribution apparatus of streaming data.

FIG. 4 depicts an internal configuration of the information processing apparatus 10 which operates as a distribution apparatus of streaming data. The information processing apparatus 10 includes a processing part 100, a communication unit 102 and an acceptance unit 104. The processing part 100 includes an application execution unit 106, an image generation unit 110, an image changeover unit 130, a sharing processing unit 150 and a proxy management unit 170. In the present embodiment, since the user A distributes a play moving image of a game, the information processing apparatus 10a in FIG. 1 has a configuration depicted in FIG. 4. It is to be noted that, in the information processing system 1, also any other user B, C or D can become a distributor of a play moving image, and accordingly, also the information processing apparatuses 10b, 10c and 10d have the configuration depicted in FIG. 4.

The image generation unit 110 generates image data to be displayed on the outputting apparatus 4 and includes a game image generation section 112, a picked up image generation section 114, a comment image generation section 116, a status image generation section 118 and a menu image generation section 120. The game image generation section 112 generates a game image indicative of a result of processing of a game program and displays the game image on the outputting apparatus 4. It is to be noted that, after a sharing process of a game image hereinafter described is started, the game image generation section 112 generates game image data, the picked up image generation section 114 generates data on a picked up image picked up with the camera 7 and the comment image generation section 116 generates comment image data while the status image generation section 118 generates status image data. Then, the image data generated in this manner are displayed in display regions of a live distribution layout to create live distribution images. The menu image generation section 120 generates menu image data in which icon images of games or applications are arrayed and displays the menu image data on the outputting apparatus 4. The image changeover unit 130 changes over an image to be displayed on the outputting apparatus 4 between a menu image and a live distribution image.

The sharing processing unit 150 carries out a process of transmitting live distribution image data generated by the image generation unit 110 to the information processing apparatus 10 of the viewing user so that a live distribution image is shared with a different user. The sharing processing unit 150 includes an input image generation section 152, an encoding section 154, a distribution processing section 156, a template retaining section 158 and an information acquisition section 160.

A proxy management unit 170 carries out a process for transferring the operation right of a game to a viewing user or regaining the operation right of a game from a viewing user. The proxy management unit 170 includes a proxy candidate presentation section 172, a requesting section 174, a response acquisition section 176, a notification section 178, an operation right changeover section 180, an operation information acquisition section 182, an operation information providing section 184, a response section 186 and a request acquisition section 188.

The components represented as functional blocks which carry out various processes in FIG. 4 can be configured, in hardware, from a circuit block, a memory and other LSIs, and is implemented, in software, by a program and so forth loaded in the memory. Accordingly, it can be recognized by those skilled in the art that the functional blocks can be implemented in various forms only from hardware, only from software or from a combination of hardware and software and are not limited to any of them.

The communication unit 102 receives information that an inputting unit of the inputting apparatus 6 is operated by a user (such information is hereinafter referred to as "operation information"). Further, the communication unit 102 transmits a content generated by the processing part 100 to the other information processing apparatus 10. Here, the content is a live distribution image generated by the image generation unit 110. The communication unit 102 is represented as a configuration having both of functions of the wireless communication module 38 and the wire communication module 40 depicted in FIG. 3.

The acceptance unit 104 is provided between the communication unit 102 and the processing part 100 and transmits data or information to and from the communication unit 102 and the processing part 100. If the acceptance unit 104 accepts operation information of an inputting unit provided in the inputting apparatus 6 through the communication unit 102, then it supplies the operation information to one, two or more of the application execution unit 106, image generation unit 110, image changeover unit 130, sharing processing unit 150 and the proxy management unit 170 of the processing part 100.

If the main power supply button 20 is depressed by the user in a state in which the main power supply to the information processing apparatus 10 is off, then the main system 60 is started up. The main system 60 supplies a generation instruction of a menu image to the menu image generation section 120, and the menu image generation section 120 generates a menu image in which icon images of applications and the like are arrayed and outputs the menu image to the outputting apparatus 4. It is to be noted that the menu image generation section 120 may generate a menu image when the user depresses the function button 80 of the inputting apparatus 6 in a state in which the main power supply to the information processing apparatus 10 is on. The function of the menu image generation section 120 is implemented by system software.

FIG. 5 depicts an example of a menu screen image displayed on the outputting apparatus 4. The menu screen image is displayed when the user is to select a game to be played or when the user browses activities of other users. In a category selection region 204, categories of menus prepared in the information processing apparatus 10 are displayed. In a game icon display region 200, icons of games which can be played by a log-in user and icons of applications which can be executed are displayed in a list in a horizontal direction of the screen. The user can operate the inputting apparatus 6 to scroll the list rightwardly or leftwardly. In the game icon display region 200, a focus region 210 is set at a predetermined position, and if a game icon in which the user is interested is placed into the focus region 210, then icons relating to the game are displayed in a relating icon display region 202 and relating information is displayed in relating information display regions 206 and 208. If the user operates an inputting unit of the inputting apparatus 6 to place the icon of a game to be played into the focus region 210 and then depresses a predetermined determination key, then the acceptance unit 104 depicted in FIG. 4 accepts the operation information as a game execution command. Thus, the application execution unit 106 executes the game.

In the relating information display region 206, relating information to the game placed in the focus region 210 is displayed, and, for example, a moving picture relating to the game is displayed. The moving picture displayed may be a play moving picture of the game accumulated in the sharing server (not shown) connected to the network 3 or a live moving picture distributed from the sharing server. In the relating information display region 208, relating information to the game placed in the focus region 210 is displayed, and, for example, a list of friends who are playing the game may be displayed. The menu image generation section 120 generates such a menu screen image and displays the menu screen image from the outputting apparatus 4.

If an execution command of a game is inputted by the user A, then the application execution unit 106 executes a program of the game placed in the focus region 210. In the present example, a game of the title "SAMURAI" is started.

Figure 6:
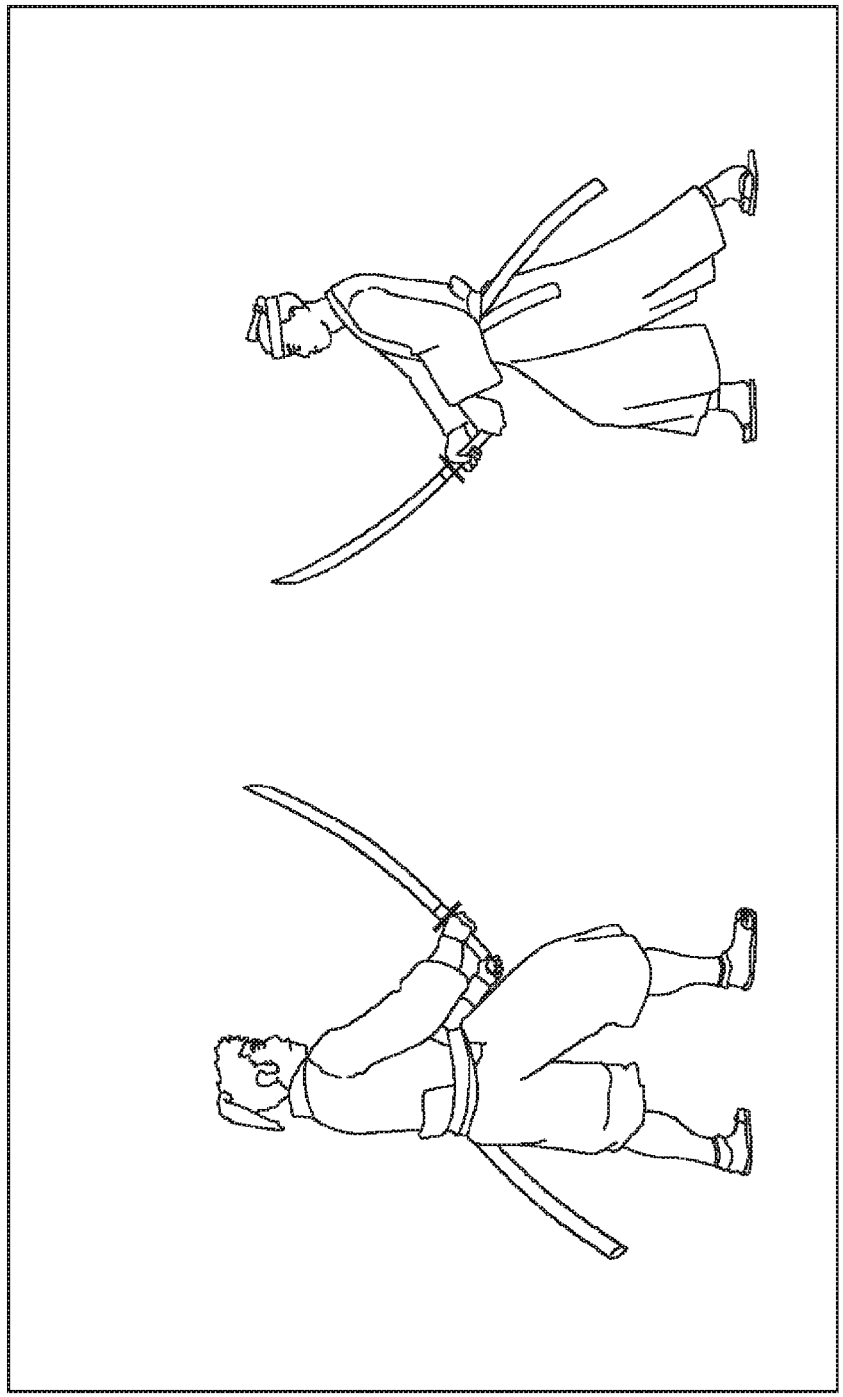
FIG. 6 is a diagram depicting an example of a game screen image displayed on the outputting apparatus.

While the application execution unit 106 in the present embodiment executes a game program, it may otherwise execute a different kind of an application program. The application execution unit 106 carries out arithmetic operation processing for moving a game character in a virtual space based on operation information inputted to the inputting apparatus 6 from the user A. Here, the application execution unit 106 may be an application (game program) itself. The game image generation section 112 may be a GPU (Graphics Processing Unit) which executes a rendering process or the like, and receives a result of processing executed by the application execution unit 106 and generates image data of the application (game) to be displayed on the outputting apparatus 4. FIG. 6 depicts an example of a game screen image displayed on the outputting apparatus 4.

The sharing processing unit 150 in the present embodiment provides a mechanism for sharing game image data generated by the image generation unit 110 with other users. This sharing process is executed taking it as a trigger that the user A operates a particular inputting unit provided on the inputting apparatus 6, here, the SHARE button 81.

If the acceptance unit 104 accepts operation information of the SHARE button 81 during game play of the user A, then the sharing processing unit 150 carries out a process for sharing image data generated by the image generation unit 110 or information relating to the image data with other users. In the following, a sharing process when the user A operates the SHARE button 81 during display of a game screen image depicted in FIG. 6 is described.

If the user A depresses the SHARE button 81, then the input image generation section 152 generates an input image indicative of choices relating to sharing of image data. On the input image displayed on the outputting apparatus 4, a GUI (Graphical User Interface) or a text inputting field into which predetermined information is to be inputted by an operation of the inputting apparatus 6 by the user A may be disposed.

Figure 7:
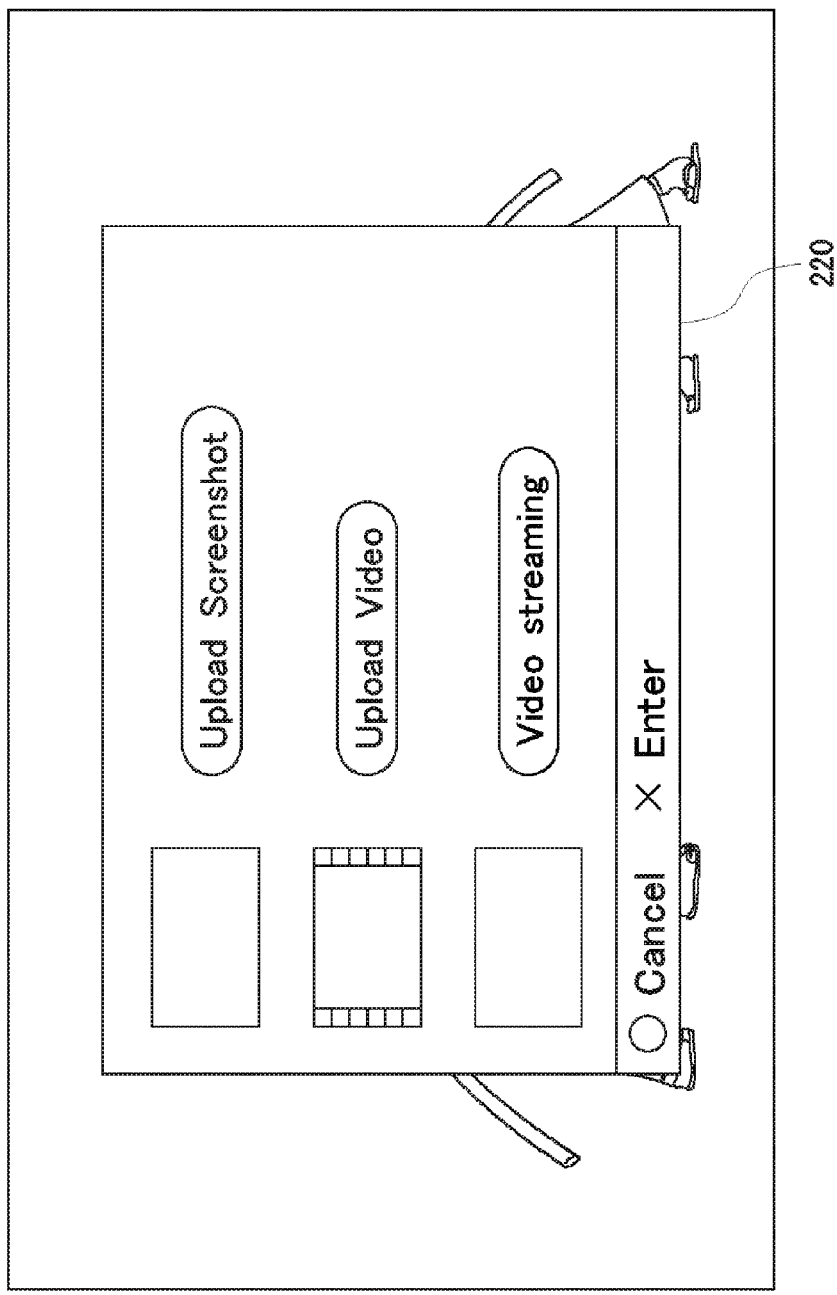
FIG. 7 is a diagram depicting an example of an inputting screen image displayed in an overlapping relationship on the game screen image.

FIG. 7 depicts an example of an input screen image displayed in an overlapping relationship with a game screen image. On the input screen image 220, three choices relating to content sharing are depicted. "Upload Screenshot" is a GUI which designates to upload image data of a screenshot; "Upload Video" is a GUI which designates to upload image data recorded in the auxiliary storage apparatus 2 to the network server 5; and "Video Streaming" is a GUI which designates a live relay of a game play video. If the user operates the inputting apparatus 6 to select one of the GUIs and depress an Enter key, then the selected sharing process is executed.

Figure 8:
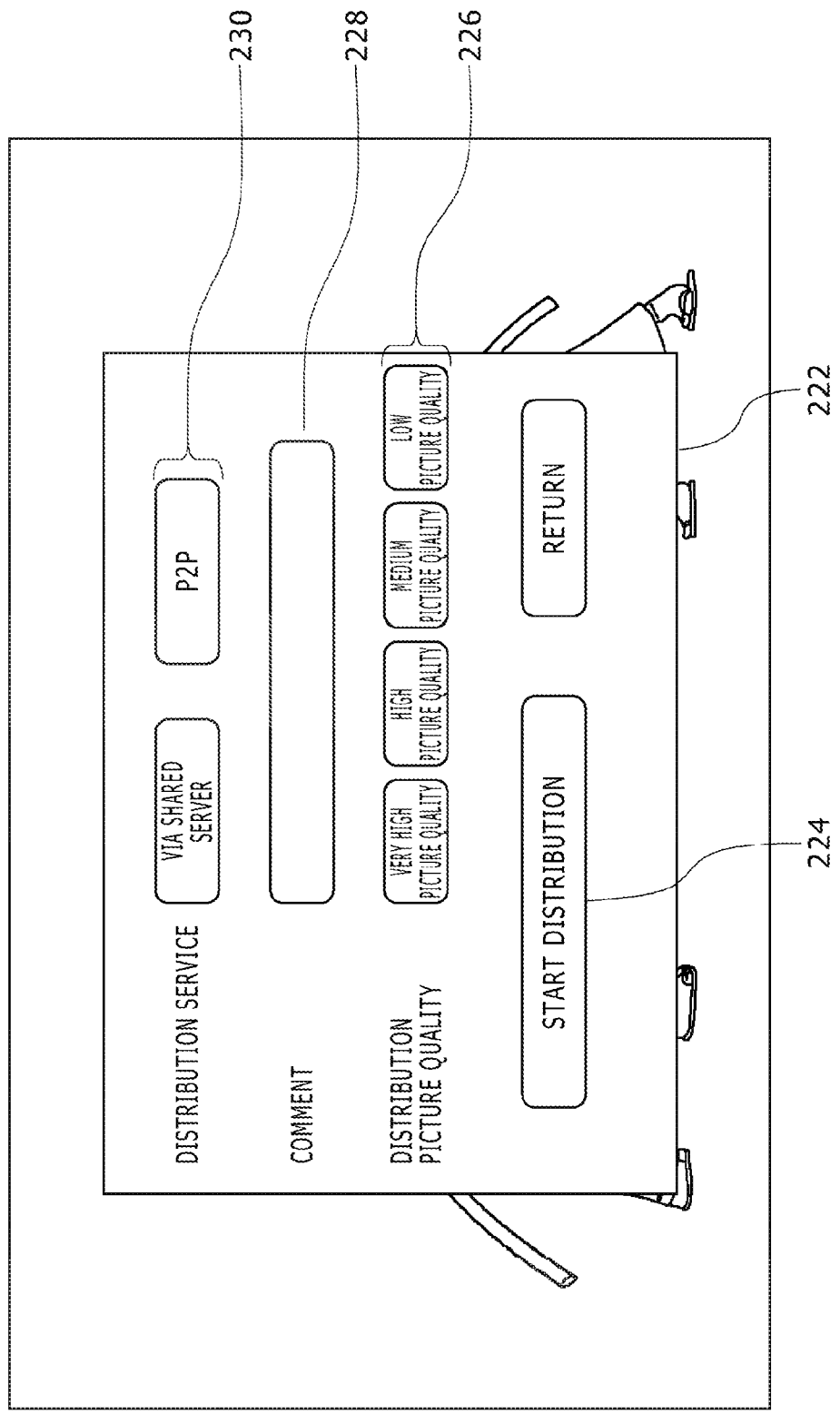
FIG. 8 is a diagram depicting an example of an inputting screen image displayed in an overlapping relationship on the game screen image when "Video Streaming" is selected.

FIG. 8 depicts an example of an input screen image displayed in an overlapping relationship with a game screen image when the "Video Streaming" is selected. On the input screen image 222, choices relating to sharing of a content are depicted. A service selection field 230 depicts choices regarding whether a content is to be shared through a sharing server or is to be shared by P2P connection. In the present example, choices regarding whether a play video of a game is to be uploaded to a sharing server which carries out image distribution or whether a different user is to be invited to a predetermined application (party application) to establish P2P connection with the different user are presented.

The user can input a comment regarding a live distribution image in the form of a text into a comment input field 228. If the user A selects the distribution of a play video by "P2P" connection, then a comment inputted to the comment input field 228 is conveyed as a message for the other users B, C and D invited by the user A to the information processing apparatuses 10b, 10c and 10d, respectively.

A picture quality selection field 226 depicts choices for selecting a picture quality of streaming data to be distributed. If the user uses the inputting apparatus 6 to select a distribution service and a distribution picture quality and input a comment and then select a distribution start button 224, then the distribution processing section 156 presents candidates for a user to be invited to a party application. Then, if the user A selects a user or users to be invited, then the distribution processing section 156 transmits, to each selected invitation user, an invitation message including information for specifying a game being played at present and the comment inputted to the comment input field 228. If a notification that the invitation is consented to is received from the information processing apparatuses 10b, 10c and 10d from the users who receive the invitation message, then the information processing apparatus 10a of the user A establishes P2P connection for communication to the information processing apparatuses 10b, 10c and 10d. In the following description, each of the users B, C and D is referred to as viewing user.

It is to be noted that, on the input screen image depicted in FIG. 8, choices regarding whether or not a picked up image of a camera is to be distributed or choices regarding whether or not microphone sound used by a user is to be distributed may be prepared such that the user A can select the choices.

If the user A selects a P2P distribution service and depresses the distribution start button 224, then the application execution unit 106 starts the party application. It is to be noted that the application execution unit 106 can execute a plurality of applications simultaneously, and accordingly, the game program and the party application are executed simultaneously.

After the party application is started, the image generation unit 110 generates a live distribution image in accordance with a template retained in the template retaining section 158. The live distribution image is outputted to and displayed on the outputting apparatus 4a and is encoded by the sharing processing unit 150 and distributed to the information processing apparatuses 10b, 10c and 10d of the viewing users. It is to be noted that, while, in the information processing system 1 of the present embodiment, the live distribution image is distributed to the information processing apparatuses 10b, 10c and 10d of the viewing users through P2P connection, it may otherwise be distributed through a sharing server.

Figure 9:
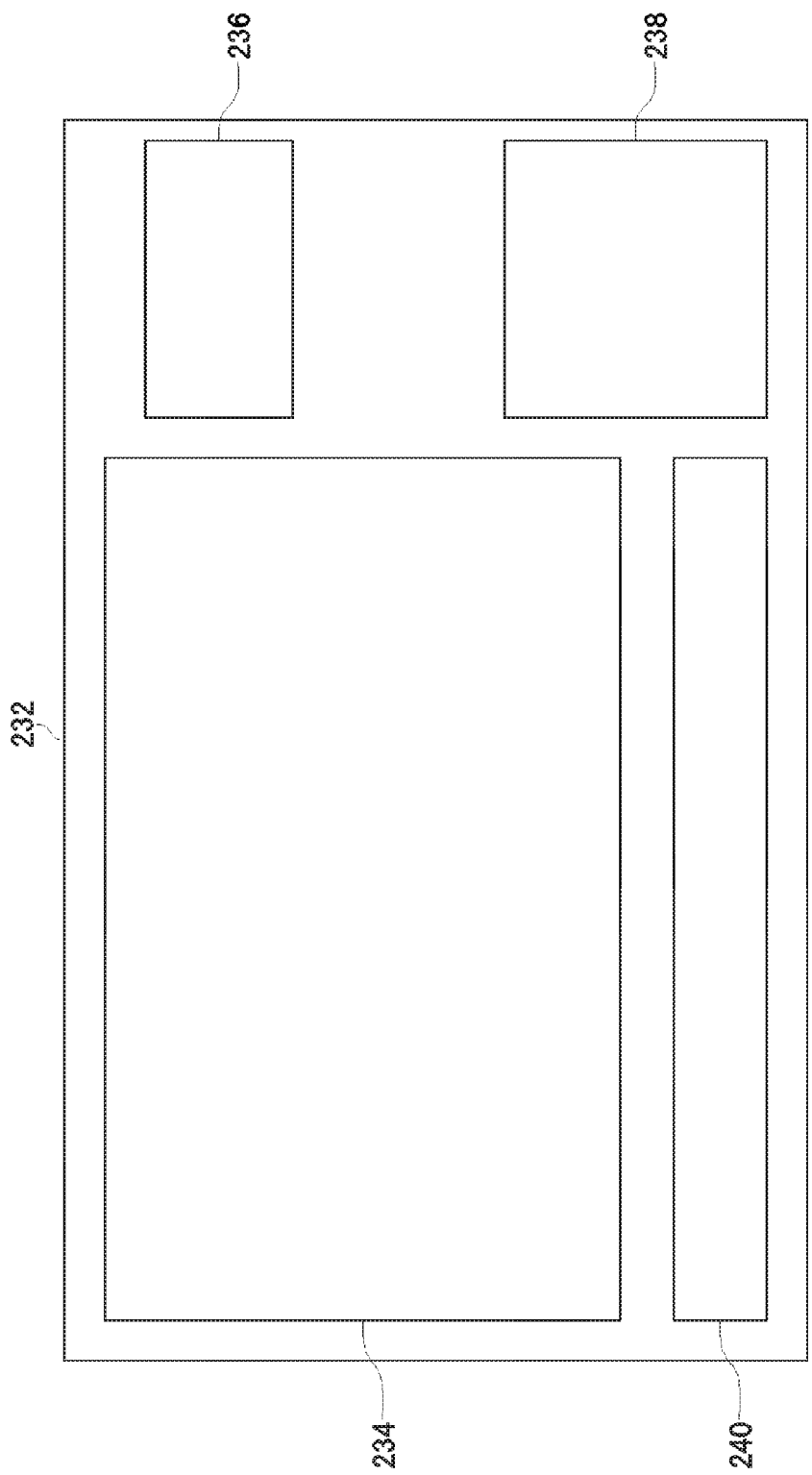
FIG. 9 is a diagram depicting an example of a template retained in a template retaining section.

FIG. 9 depicts an example of the template retained in the template retaining section 158. A template 232 defines a display layout of the entire display of the outputting apparatus 4. In an image display region 234, a game image is displayed. In a status display region 236, a distribution status is displayed. In a picked up image display region 238, a picked up image of the camera 7 is displayed. In a comment display region 240, a comment from a different user is displayed. The image generation unit 110 generates images in the display regions to generate live distribution image data.

Figure 10:
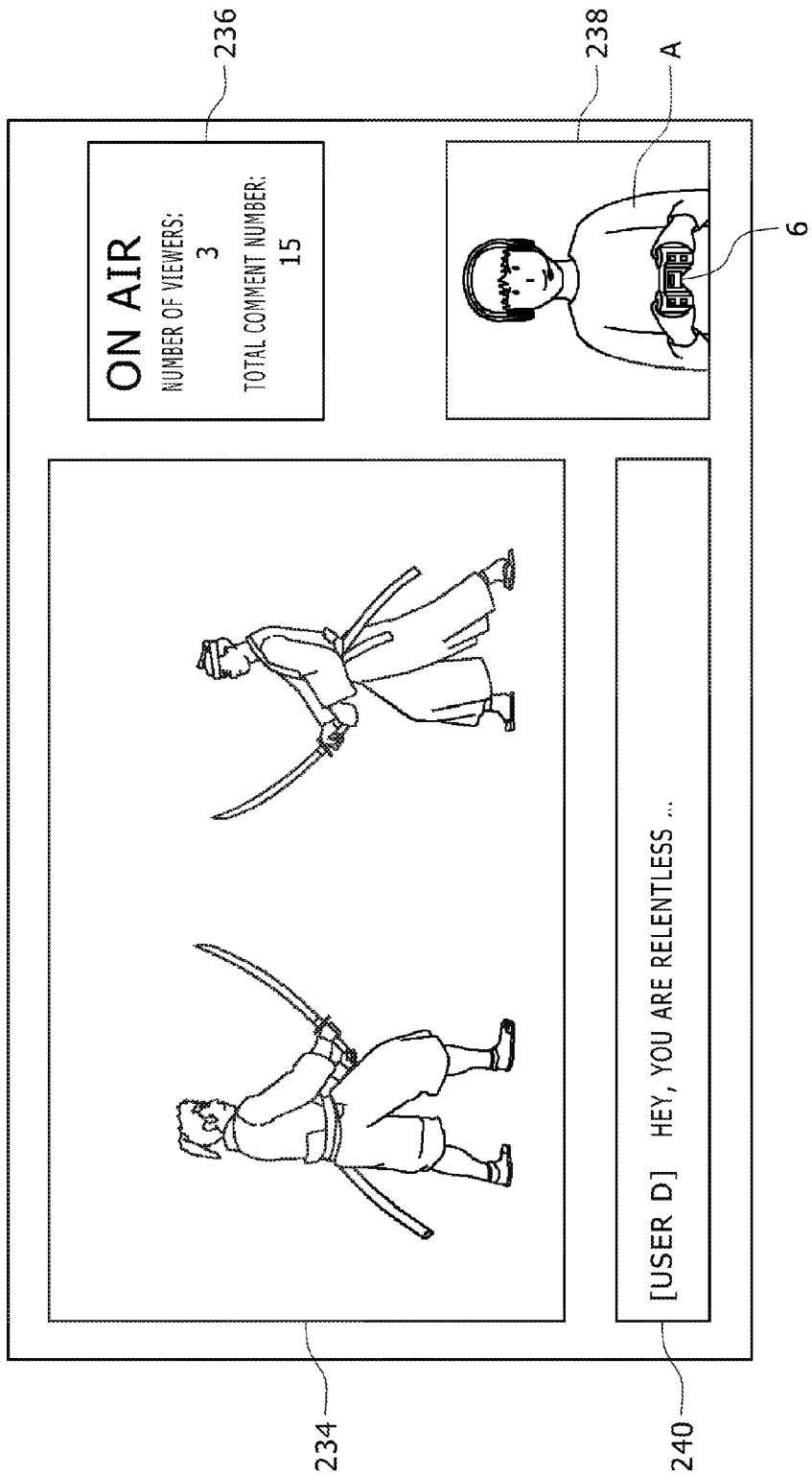
FIG. 10 is a diagram depicting an example of a live distribution screen image displayed on an outputting apparatus of a user A.

FIG. 10 depicts an example of a live distribution screen image displayed on the outputting apparatus 4a of the user A. The image generation unit 110 generates live distribution image data including a game image in accordance with the template 232 and outputs the live distribution image data to the outputting apparatus 4a and the sharing processing unit 150. The encoding section 154 encodes the live distribution image data into data of a streaming format, and the distribution processing section 156 transmits the encoded streaming data to the information processing apparatus 10 of the viewing user. Consequently, the information processing apparatuses 10b, 10c and 10d of the viewing users display the live distribution image provided thereto from the information processing apparatus 10a of the user A on the outputting apparatuses 4b, 4c and 4d. The information acquisition section 160 acquires information relating to the live distribution image data such as a viewing situation or a comment from the viewing users.

The game image generation section 112 generates game image data, and a game image is displayed in the image display region 234. The picked up image generation section 114 acquires a camera image from the camera 7 and generates picked up image data, and a picked up image is displayed in the picked up image display region 238. The comment image generation section 116 generates comment image data using comment data acquired by the information acquisition section 160, and a comment image is displayed in the comment display region 240. The status image generation section 118 generates status image data using a viewing situation acquired by the information acquisition section 160, and a status image is displayed in the status display region 236. In this manner, the image generation unit 110 generates live distribution image data in accordance with the template 232.

The live distribution image at least includes a game image and images of information acquired by the information acquisition section 160. In the present example, as images of information acquired by the information acquisition section 160, a status image in the status display region 236 and a comment image in the comment display region 240 are included. A picked up image of the camera 7 may be or may not be included in the live distribution image depending upon a desire of the user. The encoding section 154 encodes live distribution image data generated by the image generation unit 110, and the distribution processing section 156 transmits the encoded live distribution image data to the information processing apparatuses 10b, 10c, and 10d so that viewers of the live distribution image can view a game image, a comment image or a status image same as that viewed by the user A who is the distributor. It is to be noted that, where a microphone is connected to the information processing apparatus 10, the distribution processing section 156 transmits also sound from the microphone to the information processing apparatuses 10b, 10c, and 10d in synchronism with the live distribution image. Consequently, if the user A replies to the comment displayed in the comment display region 240, then also the voice of the impression is conveyed to the viewer. Accordingly, an environment in which it seems as if the viewers B, C, D and the distribution user A exist in the same room is implemented.

The information processing apparatus 10 which serves as a distribution source of streaming data is described above principally in regard to the configuration and the operation thereof. In the information processing system 1, in a state in which the users A, B, C and D watch a play video of the user A, the user A can temporarily transfer the operation right (control right) of the game to a viewing user. For example, if the user A cannot defeat an enemy character by any means and the game cannot be proceeded, then if a different user is alongside, then the inputting apparatus 6 can be passed to the different user so that the different user may play in place of the user A. In the present embodiment, although a viewing user is at a remote place, since the viewing user is viewing a same game image together, the viewing user recognizes a situation in which the user A is placed (for example, a situation in which an enemy character cannot be defeated). Therefore, the information processing system 1 provides a mechanism by which the user A transfers the operation right of the game to a viewing user so that the viewing user temporarily makes a proxy play of the game.

In the following, a configuration and operation of the information processing apparatus 10 of a viewing user is described.

Figure 11:
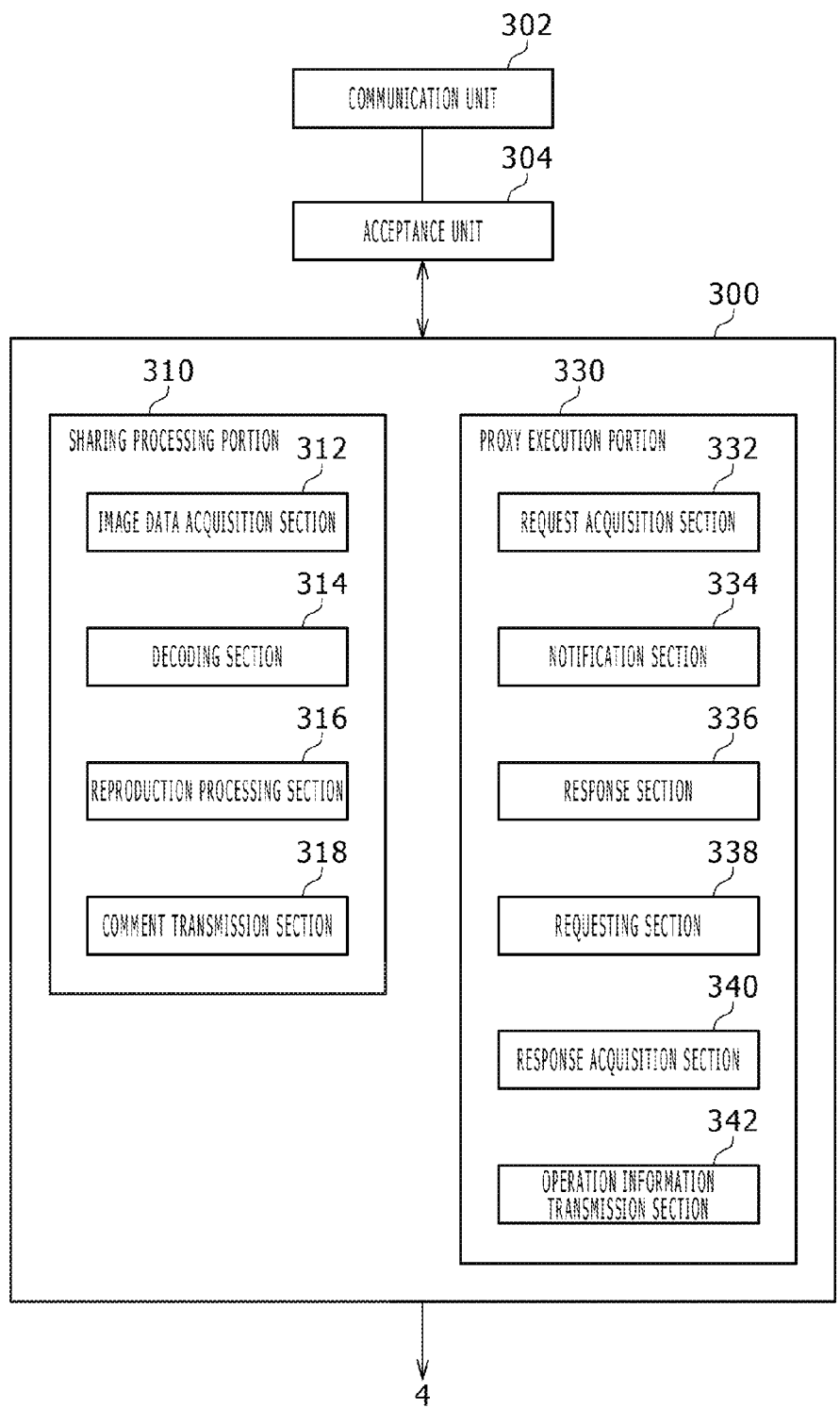
FIG. 11 is a diagram depicting an internal configuration of the information processing apparatus which operates as a reproduction apparatus of streaming data.

FIG. 11 depicts an internal configuration of the information processing apparatus 10 which operates as a reproduction apparatus of streaming data. The information processing apparatus 10 includes a processing unit 300, a communication unit 302 and an acceptance unit 304, and the processing unit 300 includes a sharing processing portion 310 and a proxy execution portion 330. In the present embodiment, since the users B, C and D view a play moving image, the information processing apparatuses 10b, 10c and 10d depicted in FIG. 1 have the configuration depicted in FIG. 11. It is to be noted that, in the information processing system 1, also the user A can become a viewer of any other user, and accordingly, also the information processing apparatus 10 has the configuration depicted in FIG. 11. In other words, the information processing apparatuses 10a to 10d are configured so as to have a function as a reproduction apparatus for reproducing streaming data while they have a function as a distribution apparatus for distributing streaming data.

The communication unit 302 receives information about an operation by a user when the inputting unit of the inputting apparatus 6 is operated by the user (the information is hereinafter referred to as "operation information") and receives image data distributed from the information processing apparatus 10a of the user A. The communication unit 302 is represented so as to have a configuration which has functions of the wireless communication module 38 and the wire communication module 40 depicted in FIG. 3 similarly to the communication unit 302.

The acceptance unit 304 is provided between the communication unit 302 and the processing unit 300 and transfers data or information to and from the communication unit 302 and the processing unit 300. The acceptance unit 304 supplies, when it accepts operation information of the inputting unit provided on the inputting apparatus 6 through the communication unit 302, the operation information to one or both of the sharing processing portion 310 and the proxy execution portion 330.

The sharing processing portion 310 has a function for reproducing streaming data distributed from the distribution processing section 156 after P2P connection to the information processing apparatus 10a of the user A is established, and includes an image data acquisition section 312, a decoding section 314, a reproduction processing section 316 and a comment transmission section 318. The image data acquisition section 312 acquires image data distributed as streaming data, and the decoding section 314 decodes the image data. Further, the reproduction processing section 316 reproduces the image data and displays a game image on the outputting apparatus 4. Consequently, on the outputting apparatuses 4b, 4c and 4d of the users B, C and D, a live distribution screen image outputted to the outputting apparatus 4a depicted in FIG. 10 is displayed. It is to be noted that, on the live distribution screen image of the viewing users, a field for inputting a comment may be formed additionally. If a viewing user inputs the comment to the comment inputting field, then the comment transmission section 318 transmits the inputted comment to the information processing apparatus 10a. Consequently, the comment from the viewing user is displayed in a comment displaying region 240 as depicted in FIG. 10.

The proxy execution portion 330 performs a process for transferring the operation right of a game from the user A to a viewing user and a process for regaining the operation right from the viewing user to the user A. The proxy execution portion 330 includes a request acquisition section 332, a notification section 334, a response section 336, a requesting section 338, a response acquisition section 340 and an operation information transmission section 342.

The components described as functional blocks for carrying out various processes in FIG. 11 can be configured, in hardware, from circuit blocks, a memory and other LSIs, and are implemented, in software, by a program loaded in the memory. Accordingly, it can be recognized by those skilled in the art that the functional blocks can be implemented in various forms from only hardware, from only software or from a combination of hardware and software, and are not limited to any of them.

In the following, a process of changing over the operation right of a game carried out by cooperation of the proxy management unit 170 of the information processing apparatus 10a and the proxy execution portions 330 in the information processing apparatuses 10b, 10c and 10d is described.

Figure 12:
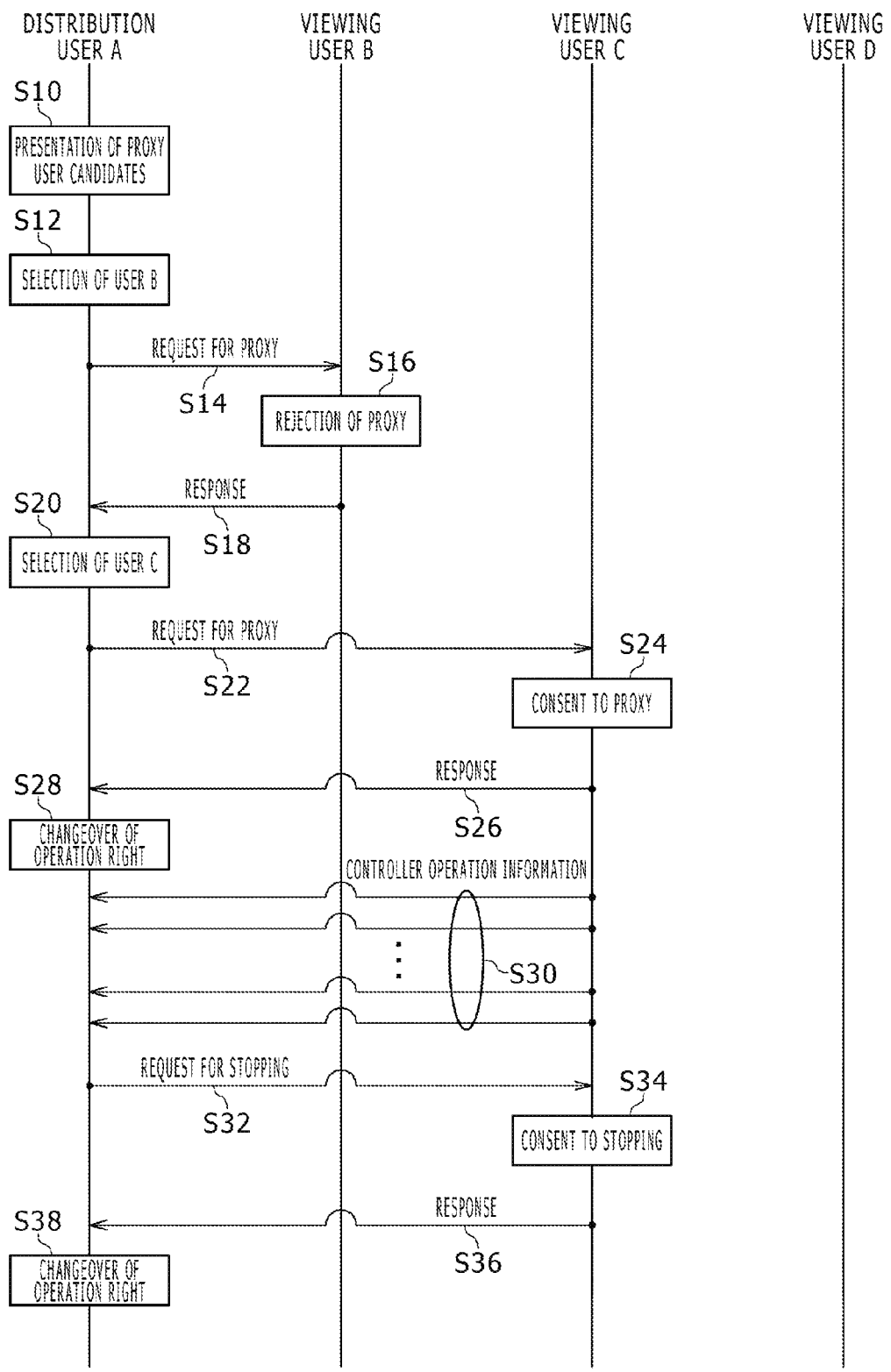
FIG. 12 is a view depicting a flow chart of a changeover processing of a game operation right.

FIG. 12 depicts a flow chart of a changeover process of the game operation right. First, as a presupposition, the party application is executed by the individual information processing apparatus 10, and a moving image of a game play by the user A is shared among the users A to D. Thus, the users are viewing the live distribution screen image displayed on the respective outputting apparatus 4, depicted in FIG. 10. If the user A operates the SHARE button 81 provided on the inputting apparatus 6 in a state in which the live distribution screen image is displayed, then a list of users who are candidates for replacement of the game play is displayed on the outputting apparatus 4a.

Figure 13:
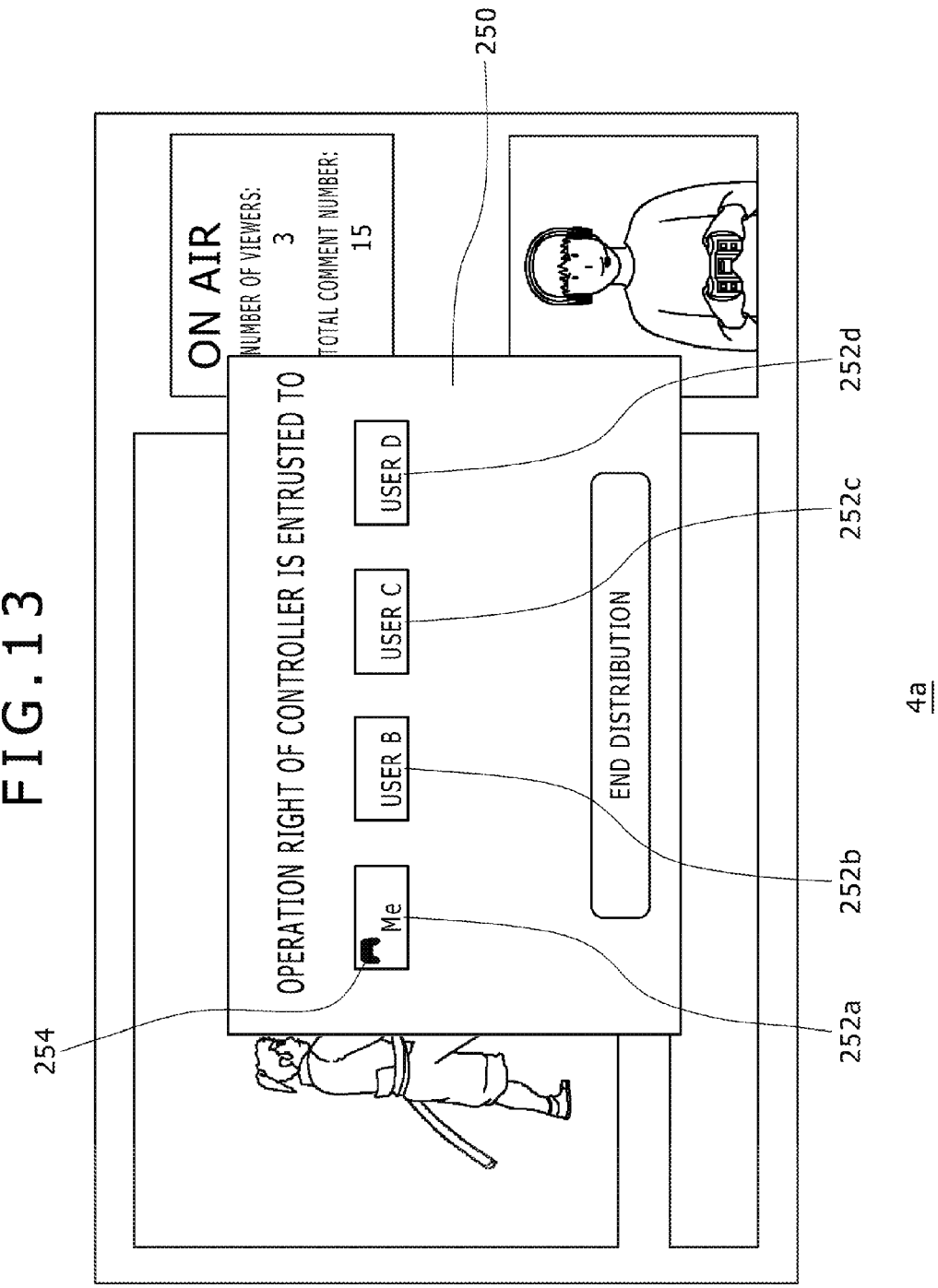
FIG. 13 is a view depicting an example of a proxy user candidate list displayed in an overlapping relationship on the live distribution screen image.

FIG. 13 depicts an example of a proxy user candidate list displayed in an overlapping relationship on the live distribution screen image. If the acceptance unit 104 of the information processing apparatus 10a of the user A accepts operation information of the SHARE button 81, then the proxy candidate presentation section 172 displays a proxy user selection screen image 250, which presents a list of user candidates for the proxy of the game play on the outputting apparatus 4a (S10). The proxy candidate presentation section 172 specifies the users B, C and D of the information processing apparatus 10b, 10c and 10d, to which the information processing apparatus 10a of the user A is connected by P2P connection, as a result of execution of the party application. The proxy candidate presentation section 172 displays viewing user specification information 252b, 252c and 252d for specifying the users B, C and D as candidates for a user who is to play the game in place of the user A in a juxtaposed relationship with each other together with distribution user specification information 252a for specifying the user A on the proxy user selection screen image 250. The distribution user specification information 252a and the viewing user specification information 252b, 252c and 252d are GUIs, and user specification information to which a controller mark 254 is put indicates that the operation right of the game controller is provided to the user.

Here, since the user A has carried out the game play until just before, the controller mark 254 is put to the distribution user specification information 252a of the user A, and accordingly, in the state depicted in FIG. 13, it is indicated that the user A has the operation right of the game.

In this manner, the proxy candidate presentation section 172 displays the distribution user specification information 252a and the viewing user specification information 252b, 252c and 252d such that a user who has the operation right of the game and a user who does not have the operation right of the game can be distinguished. In this example, the proxy candidate presentation section 172 displays the information for specifying a user having the operation right of the game by adding thereto information (controller mark 254) indicating that the user has the operation right of the game. Consequently, the user A can recognize at a glance who has the operation right of the game. It is to be noted that, although, in the embodiment, the location of the operation right of the game controller is represented by the controller mark 254, the display mode of a user specification information 252 may be made different, for example, depending upon presence or absence of the operation right so that the location of the operation right of the game controller can be confirmed.

It is to be noted that, while, in the present embodiment, only the user A is playing the game on the information processing apparatus 10a, a plurality of users including the user A are sometimes playing the game. At this time, a plurality of inputting apparatuses 6 are used in the game, the individual inputting apparatuses 6 are distinguished from each other in the game, and operation information of each of them is handled. Accordingly, in preparation for such a case, the controller mark 254 may represent information for specifying one of the plurality of inputting apparatuses 6. For example, where the inputting apparatus 6 used by the user A is identified as a first controller and the inputting apparatus 6 used by another user is identified as a second controller in the game, the controller mark 254 added to the distribution user specification information 252a of the user A (Me) in FIG. 13 preferably is a mark which represents the first controller.

The user A can select a viewing user to whom the operation right of the controller is to be entrusted by operating the direction key 71 of the inputting apparatus 6 to apply a focus on the user specification information of one of the users and depressing the determination key of the inputting apparatus 6. The user A can select any viewing user, and here, the user A selects the viewing user specification information 252b of the user B (S12).

Figure 14:
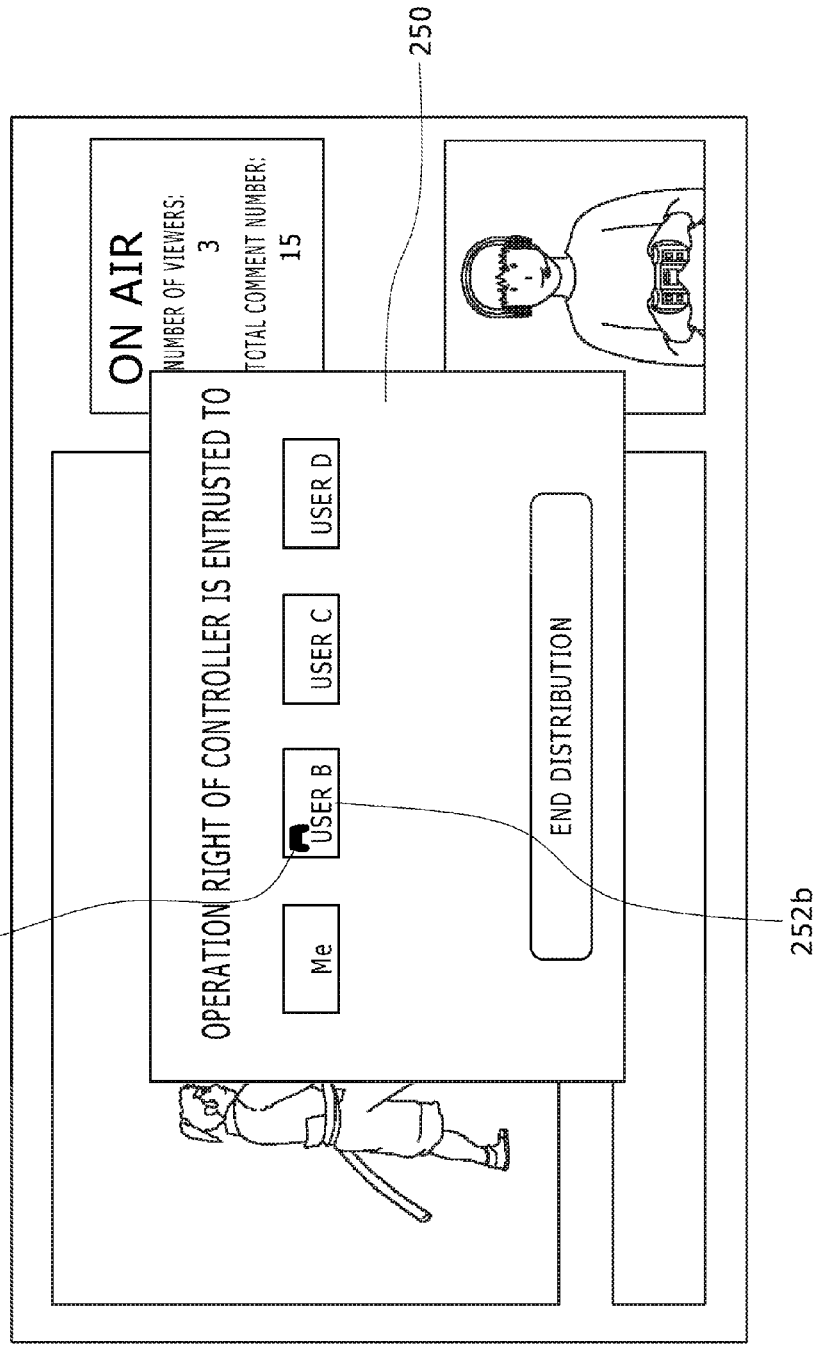
FIG. 14 is a view depicting a proxy user selection screen image when a user B is selected.

FIG. 14 depicts the proxy user selection screen image 250 when the user B is selected. If the viewing user specification information 252b is selected, then the requesting section 174 transmits a proxy request for the game play to the information processing apparatus 10b of the user B (S14). At this time, the proxy candidate presentation section 172 displays information for specifying the user to whom the proxy request for the game play is transmitted by adding thereto information indicating that a proxy for the game play is requested. In this example, the proxy candidate presentation section 172 adds the controller mark 254 to the viewing user specification information 252b. Consequently, the user A can confirm readily to whom the proxy request is sent.

It is to be noted that, while, on the proxy user selection screen image 250 depicted in FIG. 14, the controller mark 254 is put to the user specification information 252b, this does not signify that the operation right of the controller has moved from the user A to the user B. Therefore, when the controller mark 254 is put to the viewing user specification information 252b, in order to indicate that the operation right of the controller is not changed over as yet, the proxy candidate presentation section 172 may display the controller mark 254 in a display mode different from that when the operation right of the controller is changed over such as to display the controller mark 254 blinking until the proxy request is consented to, for example. It is to be noted that, for a period of time until the proxy request is consented to after it is transmitted, the proxy candidate presentation section 172 may put not the controller mark 254 but information representing that the consent to the proxy is being asked to the viewing user specification information 252b.

Figure 15:
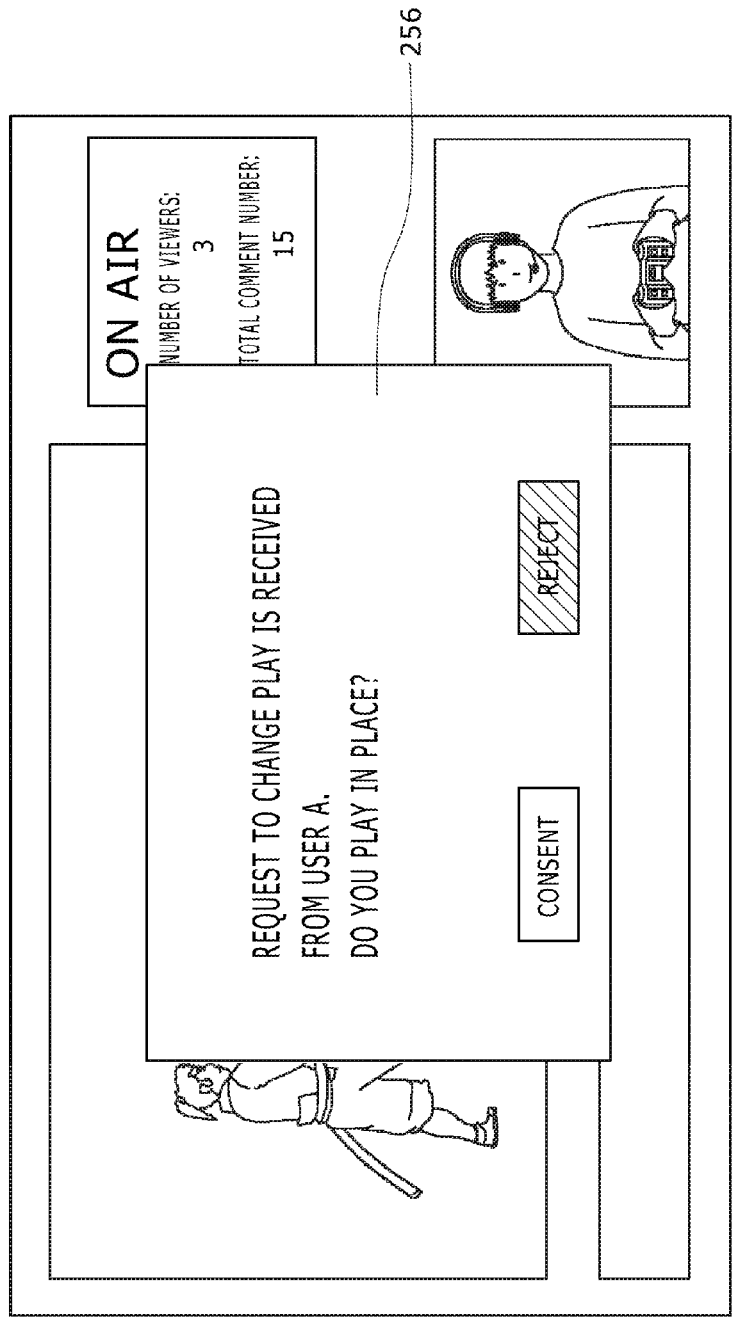

FIG. 15 depicts a confirmation screen image regarding whether or not the proxy play displayed on the outputting apparatus 4b of the user B is to be consented to. In the information processing apparatus 10b of the user B, the request acquisition section 332 acquires the proxy request for the game play from the information processing apparatus 10a, and the notification section 334 displays a proxy confirmation screen image 256 on the outputting apparatus 4b. On the proxy confirmation screen image 256, it is indicated that a request for the proxy of the play of the game is received from the user A, and the user B would select "consent" or "reject." Here, if the user B selects "reject" (S16), then the response section 336 transmits information representing that the proxy request has been rejected to the information processing apparatus 10a (S18). In the information processing apparatus 10a of the user A, the response acquisition section 176 receives the response from the information processing apparatus 10b, and the notification section 178 displays a message that "the user B has rejected the proxy play" on the outputting apparatus 4a. After the message is displayed, the proxy candidate presentation section 172 returns the controller mark 254 from the viewing user specification information 252b to the distribution user specification information 252a. It is to be noted that, although the controller mark 254 put to the viewing user specification information 252b is displayed blinking, after the controller mark 254 is put to the distribution user specification information 252a, the controller mark 254 is displayed non-blinking.

Then, the user A would select the viewing user specification information 252c of the user C (S20).

Figure 16:
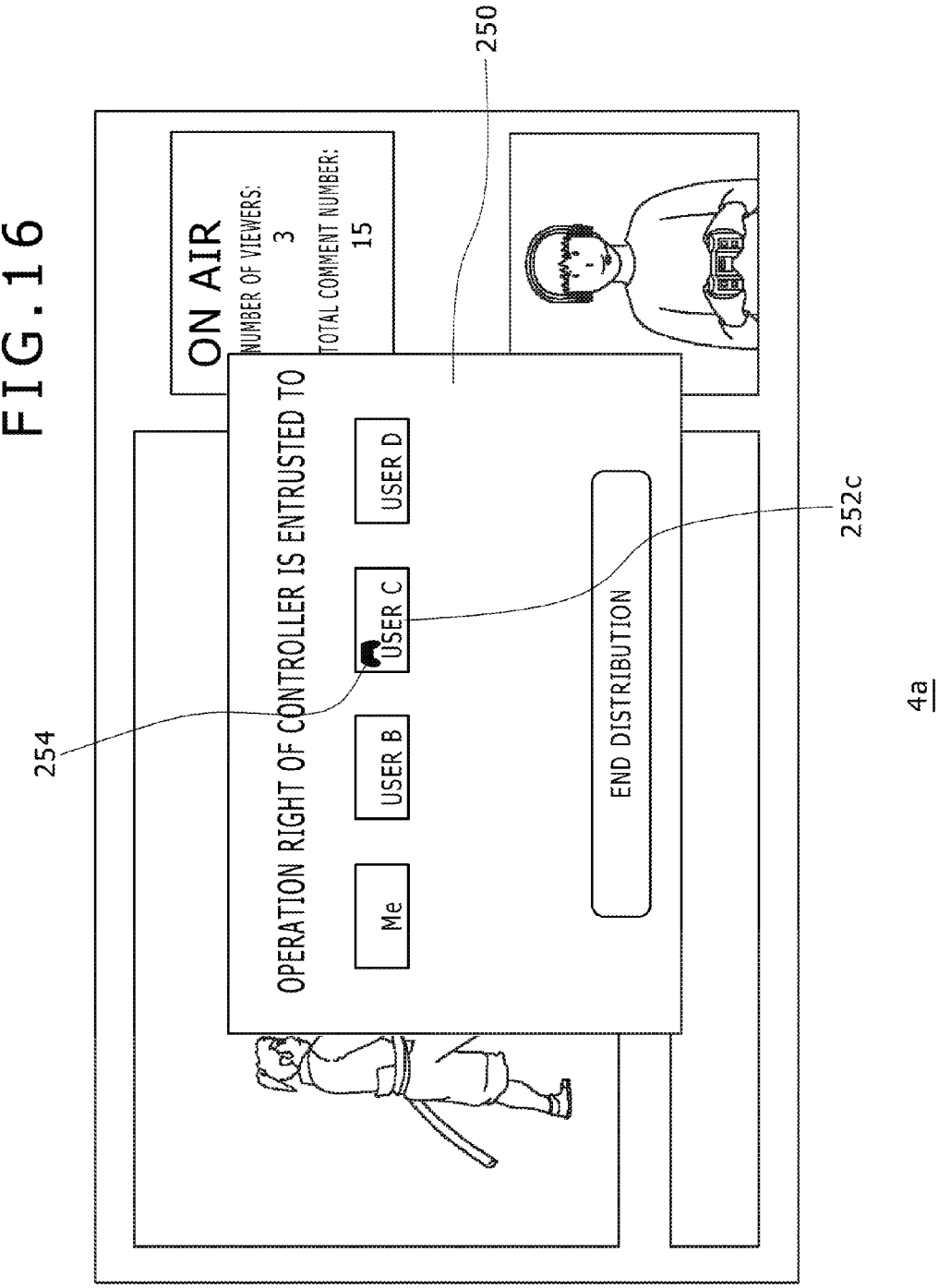
FIG. 16 is a view depicting a proxy user selection screen image when a user C is selected.

FIG. 16 depicts the proxy user selection screen image 250 when the user C is selected. If the viewing user specification information 252c is selected, then the requesting section 174 transmits a proxy request for the game play to the information processing apparatus 10c of the user C (S22). Further, at this time, the proxy candidate presentation section 172 puts the controller mark 254 to the viewing user specification information 252c. As described above, since the changeover of the operation right of the controller is not completed at this stage, the controller mark 254 is preferably displayed in a mode different from that when the changeover of the operation right of the controller is completed, and particularly, the controller mark 254 is displayed blinking.

Figure 17:
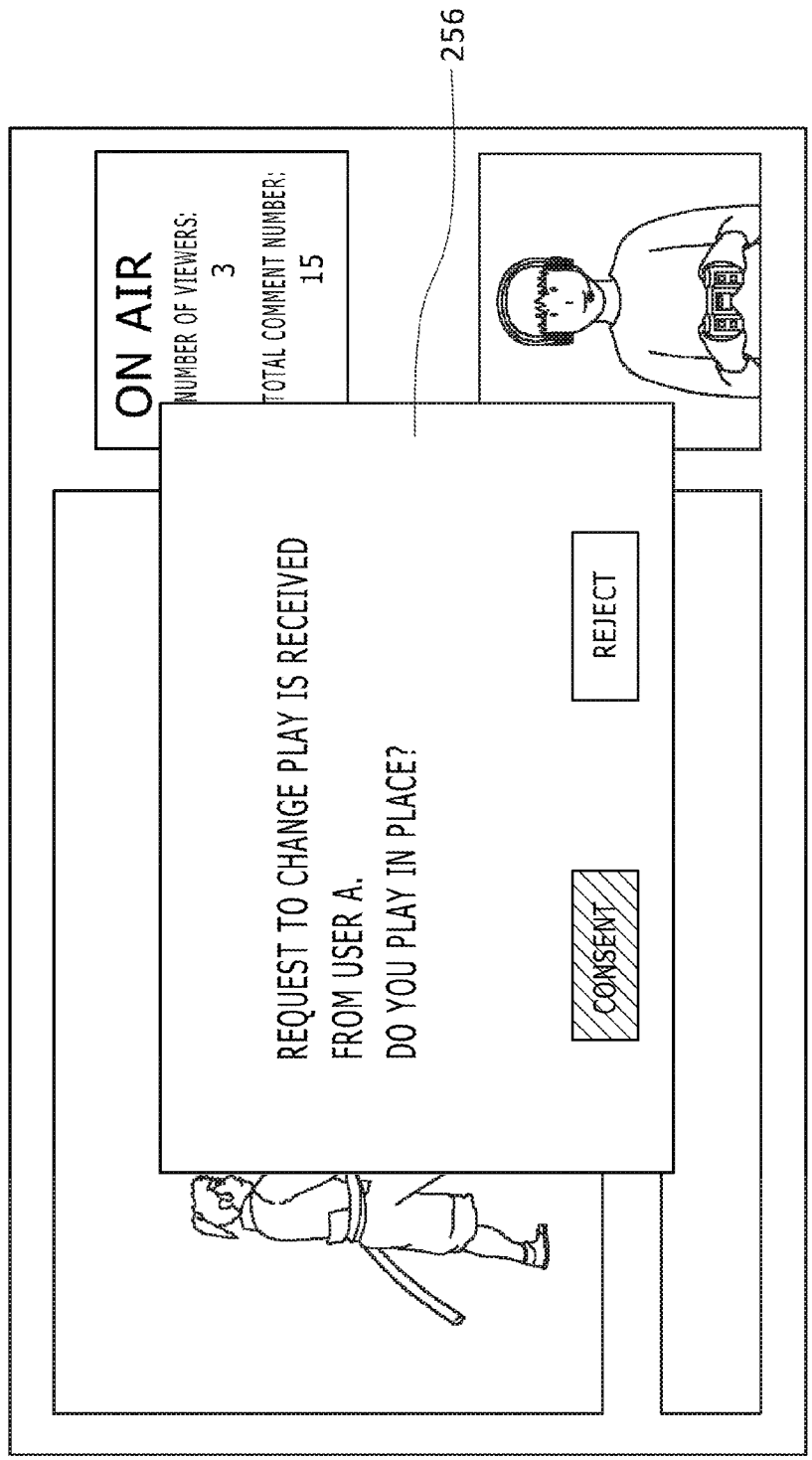

FIG. 17 depicts a confirmation screen image regarding whether or not the proxy play displayed on the outputting apparatus 4c of the user C is to be consented to. In the information processing apparatus 10c of the user C, the request acquisition section 332 acquires the proxy request for the game play from the information processing apparatus 10a, and the notification section 334 displays the proxy confirmation screen image 256 on the outputting apparatus 4c. On the proxy confirmation screen image 256, it is indicated that the request for the proxy for the play of the game has been received from the user A is received, and the user C would select "consent" or "reject." Here, if the user C selects "consent" (S24), then the response section 336 transmits information that the proxy request has been consented to the information processing apparatus 10*a* (S26).

Figure 18:
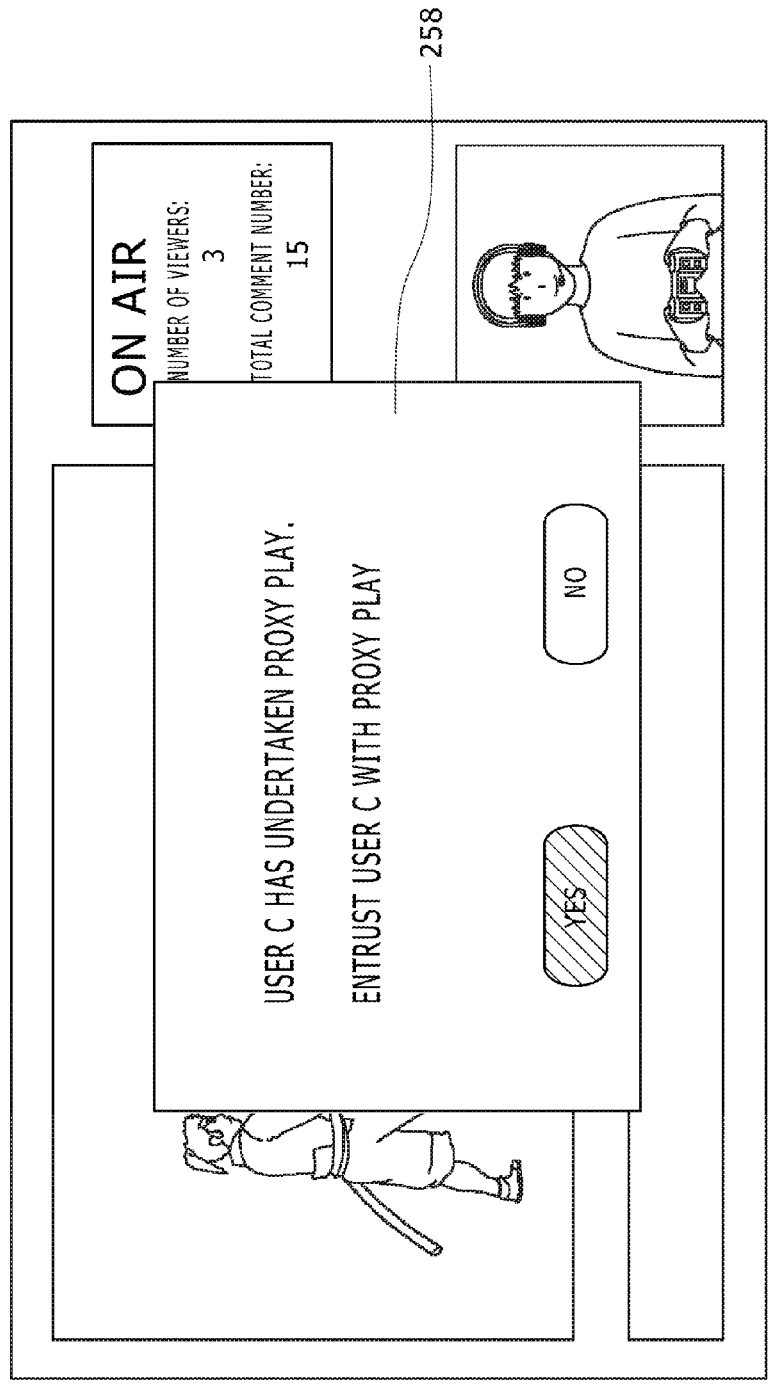
FIG. 18 is a view depicting a notification screen image displayed on the outputting apparatus of the user A.

FIG. 18 depicts a notification screen image displayed on the outputting apparatus 4*a* of the user A. If the response acquisition section 176 of the information processing apparatus 10*a* of the user A receives information indicating that the proxy request is consented to from the information processing apparatus 10*c*, then the notification section 178 displays a message indicating that "the user C consented to the proxy play" on the outputting apparatus 4*a*. In a notification screen image 258, choices regarding whether or not the user A finally entrusts the user C with the game play are displayed, and if the user A selects "Yes," then the operation right changeover section 180 changes over the operation right of the game from the user A to the user C (S28). In particular, the operation right changeover section 180 controls the operation information acquisition section 182 and the operation information providing section 184 such that the operation information to be provided to the game program executed by the application execution unit 106 may be not the operation information of the inputting apparatus 6 by the user A but the operation information of the inputting apparatus 6 by the user C.

If the operation right changeover section 180 changes over the operation right of the game from the user A to the user C, then such a message as "please play the game from now on," for example, is displayed on the outputting apparatus 4*c* of the user C. The user C would see the message and operate the inputting apparatus 6 to play the game. It is to be noted that, while the user C has the operation right after the operation right of the game is changed over from the user A to the user C, the image to be displayed on the outputting apparatus 4*c* may be changed to an image different from the live distribution image. For example, in the information processing apparatus 10*c* of the user C, the reproduction processing section 316 may enlarge a distributed game image so that the game image is displayed over an overall area of the screen of the outputting apparatus 4*c*. Further, the reproduction processing section 316 may display, on the outputting apparatus 4*c*, information indicating that the operation right has been transferred to the user C such as "at present, during proxy play." In this manner, after the user C acquires the operation right, in order to let the user C recognize that the user C has the operation right, it is preferable to display predetermined information in an overlapping relationship with the live distribution image or to change the live distribution image to a different image (for example, to the game image displayed over an overall area of the screen) to allow the user C to confirm that the user C is proxy-playing.

In the information processing apparatus 10*c* of the user C, operation information of the inputting apparatus 6 by the user C is accepted by the acceptance unit 304 and transmitted from the operation information transmission section 342 to the information processing apparatus 10*a* (S30). In this manner, after the user C consents to the proxy request for the game play, the operation information transmission section 342 transmits operation information of the user C to the information processing apparatus 10*a*. In the information processing apparatus 10*a* of the user A, the operation information acquisition section 182 acquires the operation information of the user C, and the operation information providing section 184 provides the operation information of the user C to the game program being executed. Consequently, the game program is allowed to proceed the game using not the operation information from the user A but the operation information from the user C, and proxy play of the game by the user C is implemented.

In the information processing apparatus 10*a* of the user A, during proxy play of the user C, the application execution unit 106 executes the game program in response to operation information of the user C. The game program proceeds the game using the operation information by the user C, and the image generation unit 110 generates live distribution image data including a game image on which the operation information of the user C is reflected and displays the distribution image data on the outputting apparatus 4*a*. The distribution processing section 156 distributes encoded live distribution image data to the information processing apparatuses 10*b*, 10*c* and 10*d* of the users B, C and D. Consequently, on the outputting apparatus 4 of each of the users A to D, a game image when the user C plays is displayed as a live distribution image. In this manner, in the information processing system 1, since a live distribution image is shared among the users A to D, even if the user who plays a game changes, the distribution user A and the viewing users B, C and D can enjoy a same game image.

It is to be noted that, during proxy play by the user C, the information processing apparatus 10*c* may transmit a picked up image of the camera 7 which images the user C to the information processing apparatus 10*a*. In the information processing apparatus 10*a*, the picked up image generation section 114 generates, if picked up image data is received from the information processing apparatus 10*c*, picked up image data of the user C for being displayed in the picked up image display region 238 in the live distribution image. Consequently, in the live distribution image, a situation of the user C during game play is reflected, and an environment in which the users A, B and D can view the play situation or the picked up image of the user C and support the user C is implemented.

During the game play of the user C, namely, during game play of the user other than the distribution user A, if the user A operates the SHARE button 81 provided on the inputting apparatus 6, then a request screen image relating to the proxy user is displayed on the outputting apparatus 4*a*.

Figure 19:
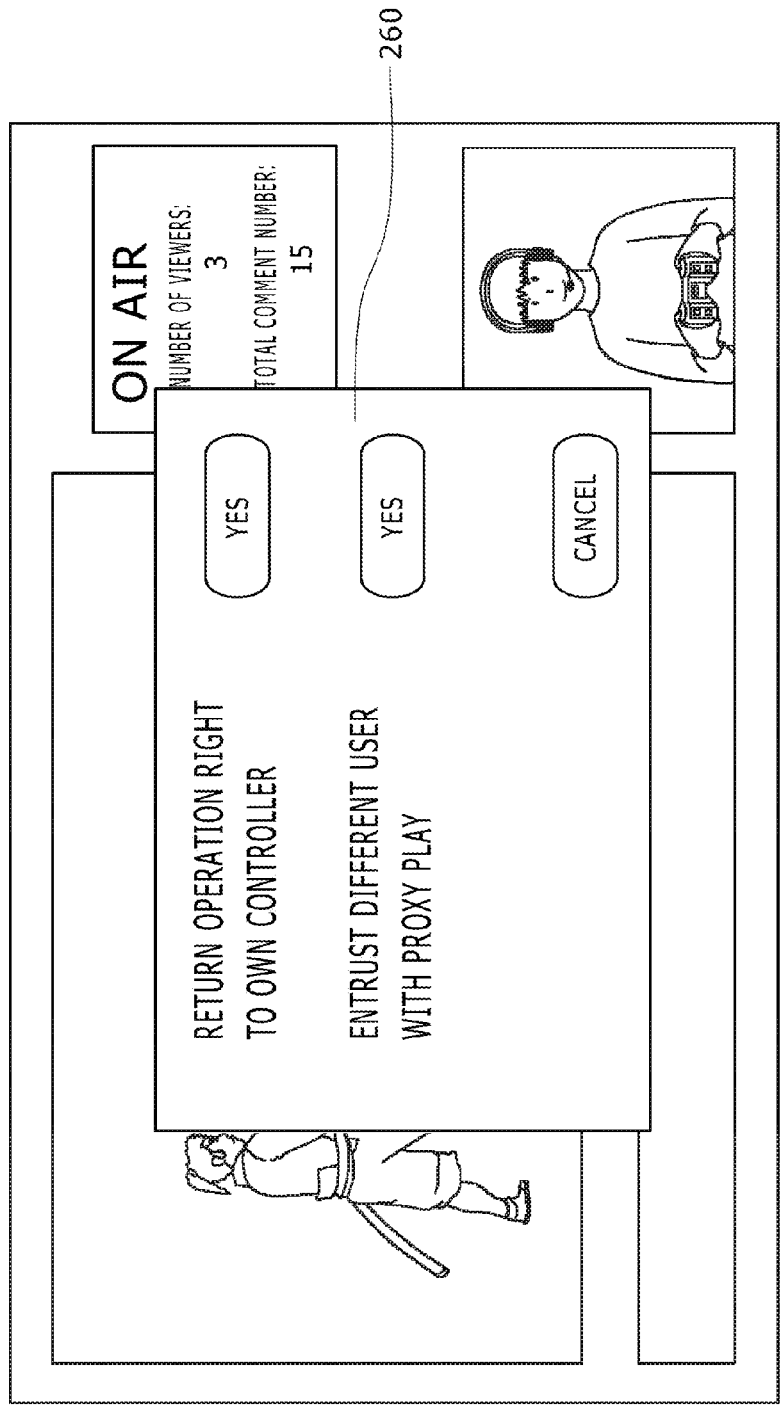
FIG. 19 is a view depicting an example of a request screen image displayed on the outputting apparatus of the user A.

FIG. 19 depicts an example of the request screen image displayed on the outputting apparatus 4*a* of the user A. If the acceptance unit 104 accepts the operation information of the SHARE button 81, then the notification section 178 generates a request screen image 260 and displays the request screen image 260 on the outputting apparatus 4*a*. On the request screen image 260, to return the operation right to the own controller and to entrust a different user with proxy play are presented as choices.

If it is selected to return the operation right to the own controller, then the requesting section 174 transmits a stopping request for the proxy of the game play to the information processing apparatus 10*c* of the user C (S32). For example, the user A may transmit a stopping request to the user C in order to return to the play after an enemy character which cannot be defeated by the user A is defeated by the user C on behalf of the user A.

Figure 20:
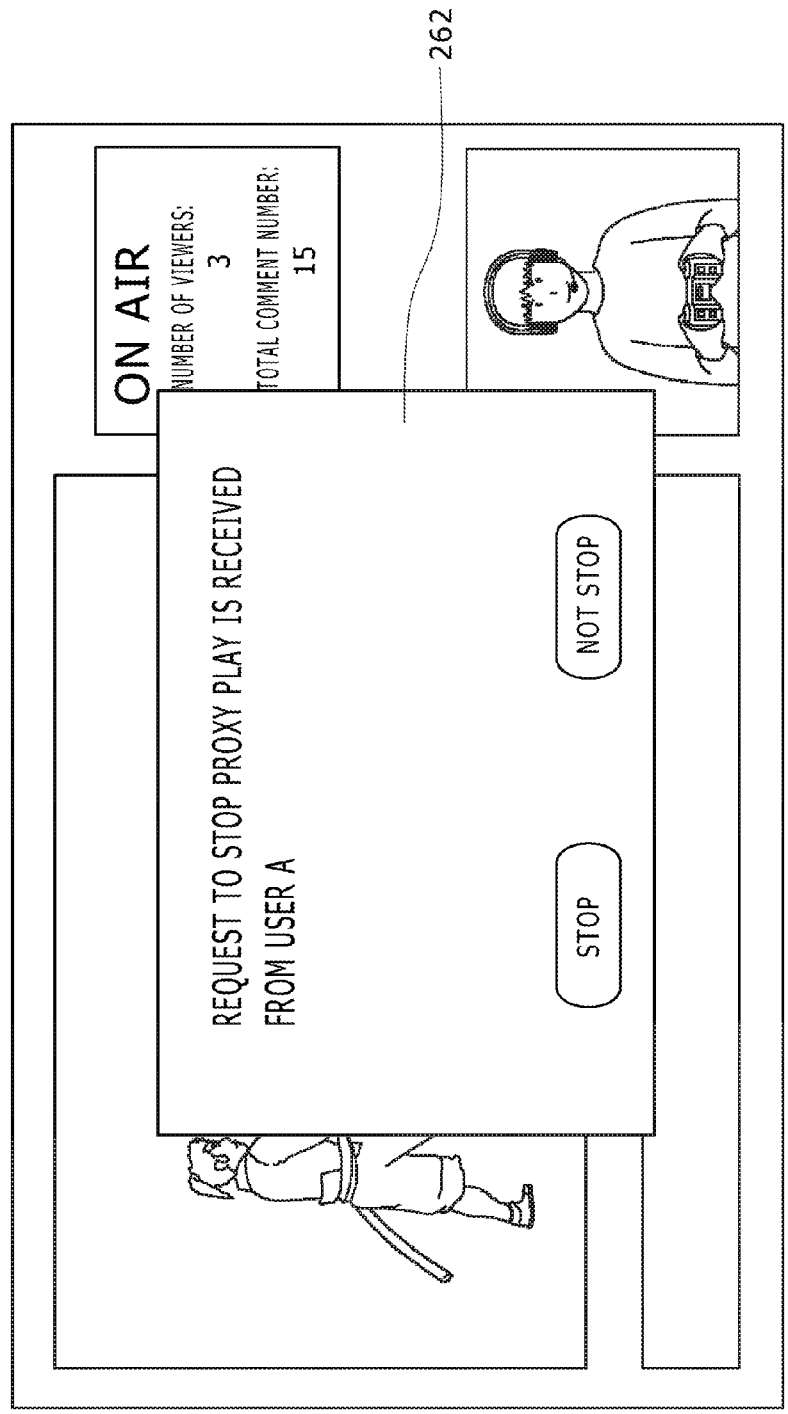
FIG. 20 is a view depicting an example of a stopping confirmation screen image displayed on the outputting apparatus of the user C.

FIG. 20 depicts an example of a stopping confirmation screen image displayed on the outputting apparatus 4*c* of the user C.

In the information processing apparatus 10*c* of the user C, if the request acquisition section 332 acquires a stopping request for the proxy of the game play, then the notification section 334 displays a stopping confirmation screen image 262 for the notification that stopping of the proxy of the game play is requested on the outputting apparatus 4c. It is to be noted that, on the stopping confirmation screen image 262, choices which can be selected by the user C to determine whether or not the game is to be stopped are prepared. For example, in such a case that the user C knows that a troublesome enemy character attacks immediately after the stopping confirmation screen image 262 is displayed, even if the operation right of the game is returned to the user A, the user A will be defeated immediately, and therefore, the selection right for the determination of whether or not the proxy play is to be stopped is provided to the user C. If the user C selects stopping on the stopping confirmation screen image 262 (S34), then the response section 336 transmits information indicating that the stopping of the proxy play is consented to the information processing apparatus 10a (S36). In the information processing apparatus 10a of the user A, when the response acquisition section 176 acquires the response from the information processing apparatus 10c, the operation right changeover section 180 changes over the operation right of the game from the user C to the user A (S38). The operation right changeover section 180 turns off the functions of the operation information acquisition section 182 and the operation information providing section 184 so that the operation information to be provided to the game program executed by the application execution unit 106 becomes not the operation information of the inputting apparatus 6 by the user C but the operation information of the inputting apparatus 6 by the user A. Consequently, the game program uses the operation information from the inputting apparatus 6 of the user A to proceed the game as usual.

It is to be noted that, if the user C selects on the stopping confirmation screen image 262 that the proxy is not stopped, then the response section 336 transmits information indicating that the proxy play is not stopped to the information processing apparatus 10a. At this time, although the operation right changeover section 180 does not carry out a changeover process of the operation right of the game, the user A may want to resume the game play immediately.

FIG. 21 depicts an example of an answer confirmation screen image displayed on the outputting apparatus 4a of the user A.

If, in the information processing apparatus 10a of the user A, the response acquisition section 176 acquires information indicating that the proxy play is not to be stopped, then the notification section 178 generates and displays an answer confirmation screen image 264 on the outputting apparatus 4a. On the answer confirmation screen image 264, It is notified that the stopping of the proxy play has been rejected by the user C, and choices regarding whether or not the continuation of the proxy play by the user C is to be permitted are presented. Here, if the user A permits, then the user C will carry out the proxy play continuously. On the other hand, if the user A does not permit, then the operation right changeover section 180 compulsorily changes over the operation right of the game from the user C to the user A. It is to be noted that, at this time, preferably the response section 186 transmits information indicating that the proxy play is to be ended compulsorily to the information processing apparatus 10c of the user C and the notification section 334 in the information processing apparatus 10c notifies the user C that the proxy play is ended compulsorily. Consequently, when the user A comes to want to play by itself, the operation right of the game can be regained by the user A.

The foregoing relates to the case in which the user A voluntarily regains the operation right of the game. However, also it is possible for the user C to voluntarily return the operation right of the game to the user A.

In the information processing apparatus 10c of the user C, the requesting section 338 transmits a stopping request for the proxy play to the information processing apparatus 10a of the user A. For example, if the user C depresses the SHARE button 81 of the inputting apparatus 6, then a request screen image for sending a stopping request for the proxy of the game play may be displayed on the outputting apparatus 4c. If the request acquisition section 188 in the information processing apparatus 10a of the user A acquires the stopping request for the proxy play, then the notification section 178 displays a stopping confirmation screen image on the outputting apparatus 4a.

FIG. 22 depicts an example of the stopping confirmation screen image displayed on the outputting apparatus 4a of the user A.

On a stopping confirmation screen image 266, choices for allowing the user A to select whether or not the stopping of the proxy play of the user C is to be consented to are prepared. If the user A selects "agree," then the operation right changeover section 180 changes over the operation right of the game from the user C to the user A. On the other hand, in the case in which it is determined that an enemy character is so strong that the user A cannot deal with the enemy character, for example, in a game situation immediately before the stopping confirmation screen image 266 is displayed, then the user A would select "not agree" in order that the proxy play may be continued by the user C. The response section 186 transmits information indicating that the user A does not agree with the stopping of the proxy play of the user C to the information processing apparatus 10c of the user C. However, it may be impossible for the user C to continue the game play because the user C must go out on an errand or in a like case. Therefore, it is preferable to make it possible for the user to issue, even in a case in which the stopping of the proxy play is not permitted by the user A, a notification of information indicating that the proxy play is stopped compulsorily from the response section 186 to the information processing apparatus 10a. If the response acquisition section 176 in the information processing apparatus 10a receives this notification, then the operation right changeover section 180 compulsorily changes over the operation right of the game from the user C to the user A.

The present invention has been described on the basis of the embodiment. This embodiment is exemplary, and it can be recognized by those skilled in the art that various modifications are possible in combination of the components and processes and also such modifications are included within the scope of the present invention.

If the user A selects to entrust a different user with the proxy play on the request screen image 260 depicted in FIG. 19, then the proxy candidate presentation section 172 displays the proxy user selection screen image 250 depicted in FIG. 16 on the outputting apparatus 4a. It is to be noted that, at this point of time, since the user C has the operation right of the game, the controller mark 254 is in a non-blinking displayed state. If, on the proxy user selection screen image 250, for example, the user A selects the viewing user specification information 252d of the user D, then the proxy confirmation screen image 256 is displayed on the outputting apparatus 4d of the user D as described hereinabove. Here, if the user D consents to execution of the proxy play, then the operation right changeover section 180 may compulsorily change over the operation right of the game from the user C to the user D.

It is to be noted that, although it is described above that the image generation unit 110 generates live distribution image data including game image data, picked up image data, comment image data and status image data, the live distribution image does not include a screen image generated by the proxy management unit 170. Merely the live distribution image depicted in FIG. 10 is distributed to the information processing apparatus 10 of the viewing user, and even if the proxy user selection screen image 250 or the like is displayed on the live distribution image on the outputting apparatus 4*a* of the user A, the proxy user selection screen image 250 is not distributed to the information processing apparatus 10 of the viewing user.

Further, it has been described in regard to the proxy play that, if the operation right changeover section 180 changes over the operation right of the game from the user A to the user C, then the operation information providing section 184 provides not the operation information of the user A but the operation information of the user C to the game program. As a modification, the operation information providing section 184 may provide the operation information not only of the user C but also of the user A to the game program. Although this corresponds to a case in which one game controller is operated by two persons, since utilization of the party application allows information exchange by chat, for example, in such a case that the operation right of the game is changed over at a timing after a short time interval, such a scheme may be adopted to create a state in which two persons can perform operation simultaneously and determine through chat which one of the two persons should play.

It has been described in the description of the embodiment that a viewing user acquires the operation right of the game through transmission of a proxy request from the distribution user A to the viewing user. However, a viewing user may ask the distribution user A to transfer the operation right of the game such that the distribution user A transfers the operation right of the game to the viewing user. In this case, when a proxy user candidate list is displayed, preferably the proxy candidate presentation section 172 can display the distribution user specification information 252*a* and the viewing user specification information 252*b*, 252*c* and 252*d* such that the user who has the operation right of the game and the other users who do not have the operation right of the game can be distinguished from each other. In particular, preferably the proxy candidate presentation section 172 displays information for specifying a user who has the operation right of the game by adding information (controller mark 254) indicating that the user has the operation right of the game.

It is to be noted that the present specification includes also the following technical ideas.

(Item 1) An information processing system in which a first information processing apparatus operated by a first user and a second information processing apparatus operated by a second user are coupled to each other through a network, wherein
the first information processing apparatus includes
an execution unit configured to execute a game program in response to operation information of the first user,
a distribution processing section configured to transmit image data of a game being played by the first user to the second information processing apparatus, and
a proxy management unit configured to display information for specifying the second user as a candidate for a user who is to play the game in place of the first user;
the second information processing apparatus includes
an image data acquisition section configured to acquire the image data of the game being played by the first user,
a reproduction processing section configured to reproduce a game image using the acquired image data,
a request acquisition section configured to acquire a proxy request for the game play,
a notification section configured to notify that the proxy for the game play is requested, and
an operation information transmission section configured to transmit, after the second user consents to the proxy request for the game play, operation information of the second user to the first information processing apparatus;
the execution unit executes a game program in response to the operation information of the second user; and
the distribution processing section transmits image data of the game being played by the second user to the second information processing apparatus.

(Item 2) The information processing system according to item 1, wherein the first information processing apparatus further includes an image generation unit configured to generate image data of the game being played by the first user.

(Item 3) The information processing system according to item 1 or 2, wherein the proxy management unit transmits a stopping request for the proxy of the game play to the second information processing apparatus.

(Item 4) The information processing system according to item 3, wherein the request acquisition section acquires the stopping request for the proxy of the game play, and the notification section notifies that the stopping of the proxy of the game play is requested.

(Item 5) The information processing system according to any one of items 1 to 4, wherein the second information processing apparatus further includes a requesting section configured to transmit a stopping request for the proxy of the game play to the first information processing apparatus.

REFERENCE SIGNS LIST

1 . . . Information processing system, 3 . . . Network, 4 . . . Outputting apparatus, 6 . . . Inputting apparatus, 10 . . . Information processing apparatus, 100 . . . Processing unit, 102 . . . Communication unit, 104 . . . Acceptance unit, 106 . . . Application execution unit, 110 . . . Image generation unit, 112 . . . Game image generation section, 114 . . . Picked up image generation section, 116 . . . Comment image generation section, 118 . . . Status image generation section, 120 . . . Menu image generation section, 130 . . . Image changeover unit, 150 . . . Sharing processing unit, 152 . . . Input image generation section, 154 . . . Encoding section, 156 . . . Distribution processing section, 158 . . . Template retaining section, 160 . . . Information acquisition section, 170 . . . Proxy management unit, 172 . . . Proxy candidate presentation section, 174 . . . Requesting section, 176 . . . Response acquisition section, 178 . . . Notification section, 180 . . . Operation right changeover section, 182 . . . Operation information acquisition section, 184 . . . Operation information providing section, 186 . . . Response section, 188 . . . Request acquisition section, 300 . . . Processing unit, 302 . . . Communication unit, 304 . . . Acceptance unit, 310 . . . Sharing processing portion, 312 . . . Image data acquisition section, 314 . . . Decoding section, 316 . . . Reproduction processing section, 318 . . . Comment transmission section, 330 . . . Proxy execution portion, 332 . . . Request acquisition section, 334 . . . Notification section, 336 . . . Response section, 338 . . .

Requesting section, 340 . . . Response acquisition section, 342 . . . Operation information transmission section.

INDUSTRIAL APPLICABILITY

The present invention can be utilized in a technical field in which streaming data of a game image is distributed.

The invention claimed is:

1. An information processing system in which a first information processing apparatus operated by a first user and a second information processing apparatus operated by a second user are coupled to each other through a network, wherein
the first information processing apparatus includes
an execution unit configured to execute a game program in response to operation information of the first user,
a distribution processing section configured to transmit image data of a game being played by the first user to the second information processing apparatus, and
a proxy management unit configured to display information for specifying the second user as a candidate for a user who is to play the game in place of the first user;
the second information processing apparatus includes
an image data acquisition section configured to acquire the image data of the game being played by the first user,
a reproduction processing section configured to reproduce a game image using the acquired image data, and
an operation information transmission section configured to transmit operation information of the second user to the first information processing apparatus; and
the proxy management unit displays,
when candidates for a user are displayed, user specification information in such a manner that a user who has an operation right of the game and a user who does not have the operation right of the game can be distinguished from each other.

2. The information processing system according to claim 1, wherein the proxy management unit displays such that the information for specifying the user who has the operation right of the game has added thereto information which indicates that the user has the operation right of the game.

3. The information processing system according to claim 1, wherein the proxy management unit displays such that the information for specifying the user to whom a proxy request for the game play has been transmitted has added thereto information indicating that the proxy of the game play is requested.

4. The information processing system according to claim 1, wherein
the execution unit executes a game program in response to the operation information of the second user; and
the distribution processing section transmits image data of the game being played by the second user to the second information processing apparatus.

5. An information processing apparatus operated by a first user, comprising:
an execution unit configured to execute a game program in response to operation information of the first user;
a distribution processing section configured to transmit image data of a game being played by the first user to a different information processing apparatus operated by a second user; and
a proxy management unit configured to display information for specifying the second user as a candidate for a user who is to play the game in place of the first user, wherein
the proxy management unit displays,
when candidates for a user are displayed, user specification information in such a manner that a user who has an operation right of the game and a user who does not have the operation right of the game can be distinguished from each other.

6. A non-transitory, computer-readable recording medium in which a program for a computer operated by a first user is recorded, the program, which when executed by a computer causes the computer to carrying out actions, comprising:
by a distribution processing section, transmitting image data of a game being played by the first user to a different information processing apparatus operated by a second user; and
by a proxy management unit, displaying information for specifying the second user as a candidate for a user who is to play the game in place of the first user,
wherein the displaying of the user specification information displays, when candidates for a user are displayed, the user specification information in such a manner that a user who has an operation right of the game and a user who does not have the operation right of the game can be distinguished from each other.

\* \* \* \* \*